Figure 1:
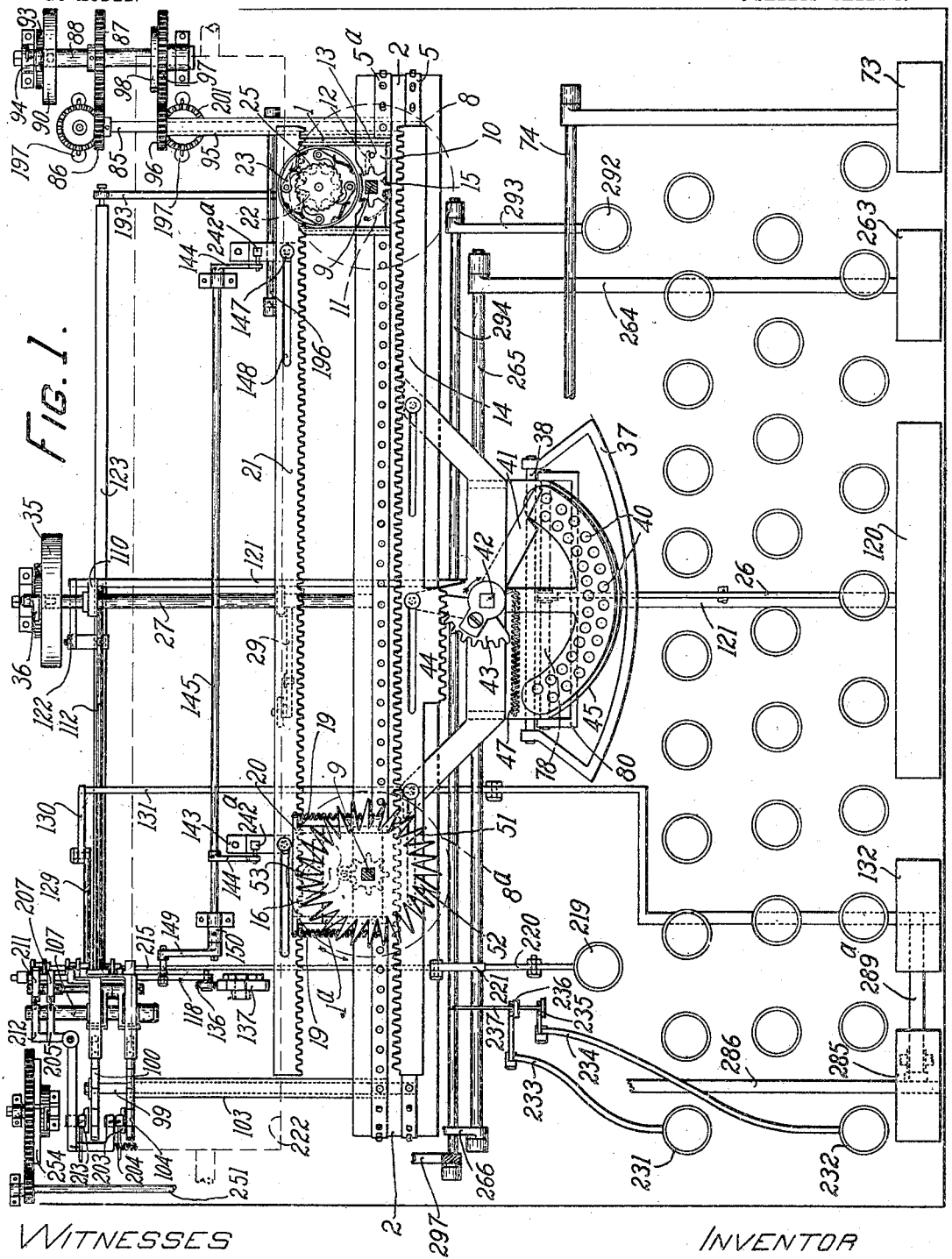

No. 770,192. PATENTED SEPT. 13, 1904.
A. M. SMITH.
TYPE WRITING MACHINE.
APPLICATION FILED JUNE 3, 1904.
NO MODEL. 6 SHEETS—SHEET 1.

WITNESSES
A. T. Palmer
H. A. Dugan

INVENTOR
ARTHUR MAXSON SMITH
BY
Ira L. Fish
ATTY.

No. 770,192. PATENTED SEPT. 13, 1904.
A. M. SMITH.
TYPE WRITING MACHINE.
APPLICATION FILED JUNE 3, 1904.
NO MODEL. 6 SHEETS—SHEET 2.

WITNESSES
A. F. Palmer
K. A. Dugan

INVENTOR
ARTHUR MAXSON SMITH
BY
Ira L. Fish
ATT'Y.

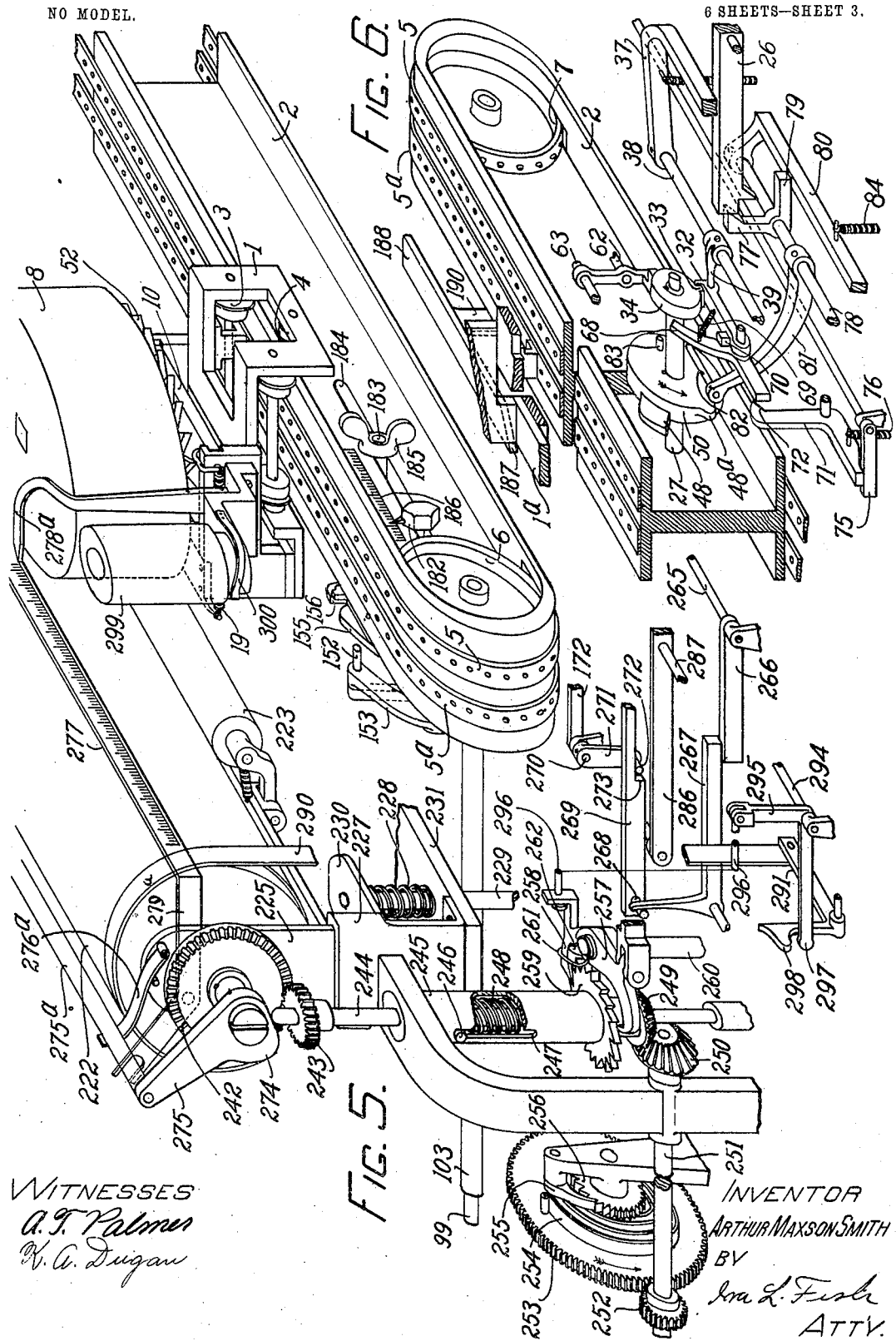

No. 770,192. PATENTED SEPT. 13, 1904.
A. M. SMITH.
TYPE WRITING MACHINE.
APPLICATION FILED JUNE 3, 1904.
NO MODEL. 6 SHEETS—SHEET 4.

WITNESSES
A. T. Palmer
H. A. Dugan

INVENTOR
ARTHUR MAXSON SMITH
BY
Ira L. Fish
ATTY.

No. 770,192. PATENTED SEPT. 13, 1904.
A. M. SMITH.
TYPE WRITING MACHINE.
APPLICATION FILED JUNE 3, 1904.
NO MODEL. 6 SHEETS—SHEET 5.
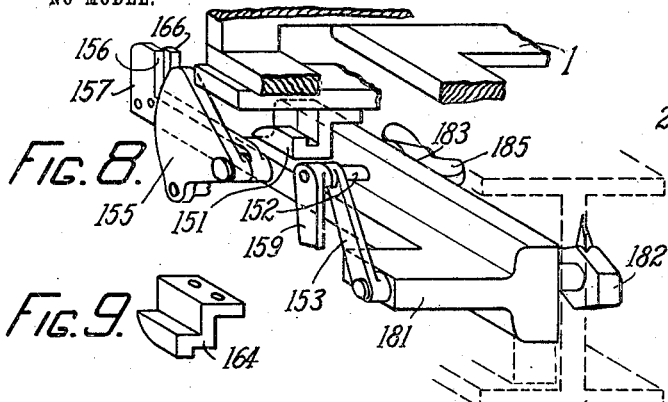
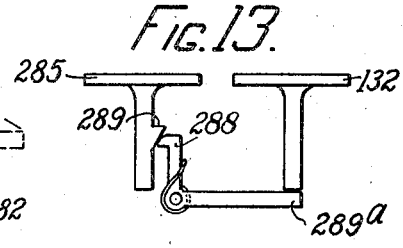
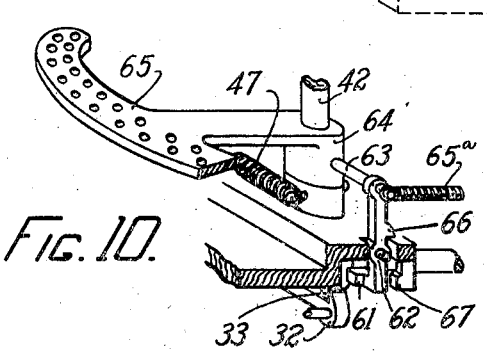
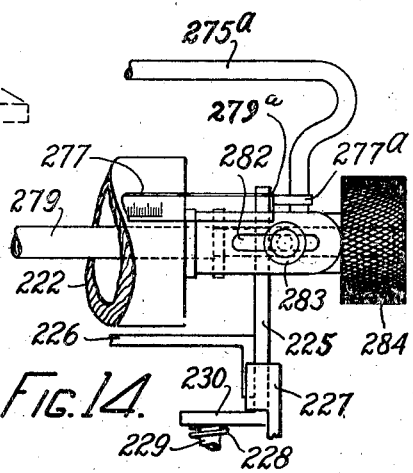
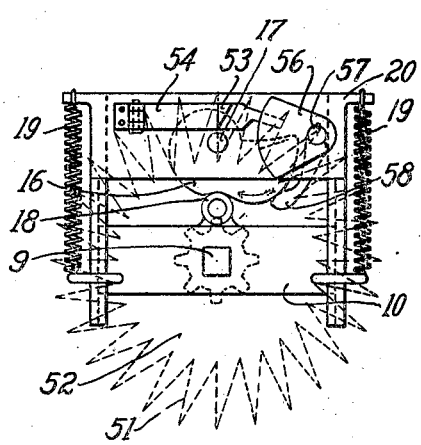
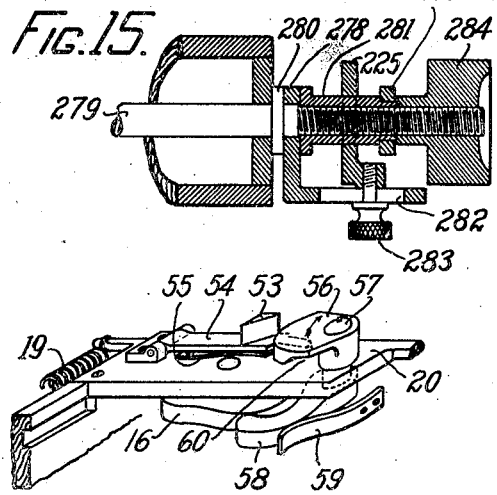
WITNESSES
INVENTOR
ARTHUR MAXSON SMITH,
BY Ira L. Fish
ATTY.

No. 770,192. PATENTED SEPT. 13, 1904.
A. M. SMITH.
TYPE WRITING MACHINE.
APPLICATION FILED JUNE 3, 1904.
NO MODEL. 6 SHEETS—SHEET 6.

WITNESSES
A. T. Palmer
K. A. Dugan

INVENTOR
Arthur Maxson Smith
BY
Ira L. Fish
ATTY.

No. 770,192. Patented September 13, 1904.

UNITED STATES PATENT OFFICE.

ARTHUR MAXSON SMITH, OF CAMBRIDGE, MASSACHUSETTS.

TYPE-WRITING MACHINE.

SPECIFICATION forming part of Letters Patent No. 770,192, dated September 13, 1904.

Application filed June 3, 1904. Serial No. 210,926. (No model.)

*To all whom it may concern:*

Be it known that I, ARTHUR MAXSON SMITH, of Cambridge, in the county of Middlesex and State of Massachusetts, have invented certain new and useful Improvements in Type-Writing Machines, of which the following is a specification.

The invention relates to type-writing machines; and one of the primary objects is to provide a machine in which the operation of writing may be substantially continuous, with a resulting increase in the speed with which the writing may be performed.

I provide for substantially continuous writing by employing a plurality of type mechanisms so controlled that an idle mechanism begins to write at the left margin of writing immediately upon the dismissal of an active mechanism, suitable means being provided to return the dismissed type mechanism to proper position at the beginning of a line. The type mechanisms, which are operatively interchangeable, are thus rendered successively operable, so that the operation of writing may be substantially continuous. The interchangeable type mechanisms may be of any suitable construction and may be controlled and operated by any suitable devices, either electrical, pneumatic, or purely mechanical, without departing from the broad scope of the invention.

In practicing the invention I have employed a type mechanism which is advanced a step along the line of writing after each impression, the positioning of the type characters at the impression-point and the forming of the impression being effected through a stationary bank of keys corresponding to the characters of the type mechanism.

The type mechanisms are mounted to travel in an endless path, and one mechanism stands at the initial position while the mechanism in advance is under control of the keys and is immediately brought under the control of the keys when the active mechanism is dismissed for the purpose of returning it to initial position. The dismissal of the active type mechanism and the bringing of an idle mechanism into action may be controlled wholly by the operator, if desired, through the operation of a properly-connected key. An increased speed may be obtained, however, by providing means for automatically effecting these operations when the writing is continued to the right margin of writing, and I therefore prefer to employ such means in practicing the invention. I have so constructed this means that it may be adjusted to vary the margin of writing and have also made provision for preventing the automatic dismissal of the active-type mechanism until the word at the end of the line has been completed.

The features of invention relating to the construction of the type mechanism and the devices employed for operating and controlling it which I have employed in practicing the features of invention by which provision is made for continuous writing are not confined in their application to machines of this character, but may be employed with advantage in machines which are not adapted for continuous writing. The same is true of many of the features of invention which I have employed in producing a simple and efficient machine for accomplishing the primary object above stated. I also wish it understood that many of the features of invention which I have embodied in this machine are not confined in their application to machines in which the letter-spacing is effected by advancing the type mechanism along the line of writing, but may be embodied with advantage in machines in which the letter-spacing is effected by movement of the platen-roll carriage along the line of writing. For instance, the broader features of invention, relating to the automatic return of the part which is spaced during the writing to initial position when the end of the line is reached, may be used with advantage in many, if not all, the common types of machines in which the platen-roll is carried on a carriage which is advanced a letter-space after each impression. In either case the carriage (whether carrying the type mechanism or paper) will be automatically returned to initial position after a word at the end of a line is completed without requiring the attention of the operator, thereby increasing the speed of writing. It is not material to this feature whether the carriage is returned in the path traveled during the writing or in a different path.

The features of invention relating to controlling the impression-making means from the type-positioning means, so that the operation of the impression-making means is dependent upon the completion of the operation of the positioning means, may also be employed in machines wherein the letter-spacing is effected by either a travel of the paper-platen or the type mechanism. Other features are also applicable to either style of machine, as will more fully appear from the claims.

The various features of the invention will be set forth in the claims and will be understood from the following detailed description of the machine in which I have embodied them and which is illustrated in the accompanying drawings.

Figure 2:
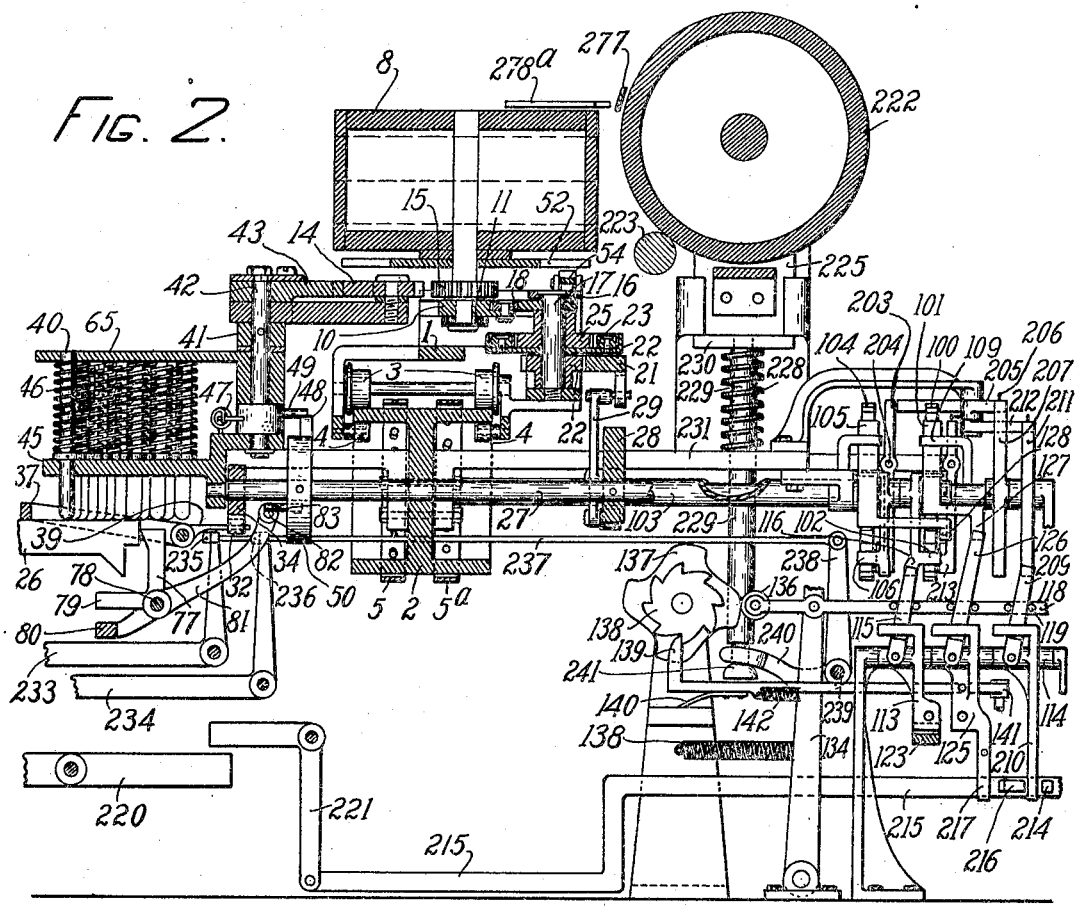
Figure 3:
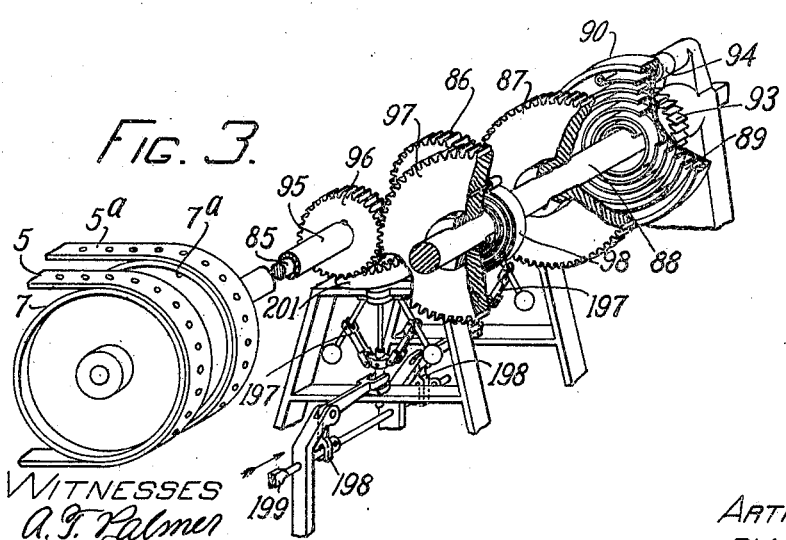
Figure 4:
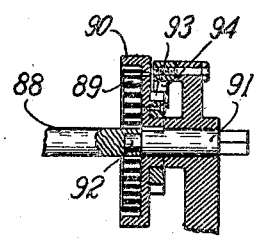
Figure 7:
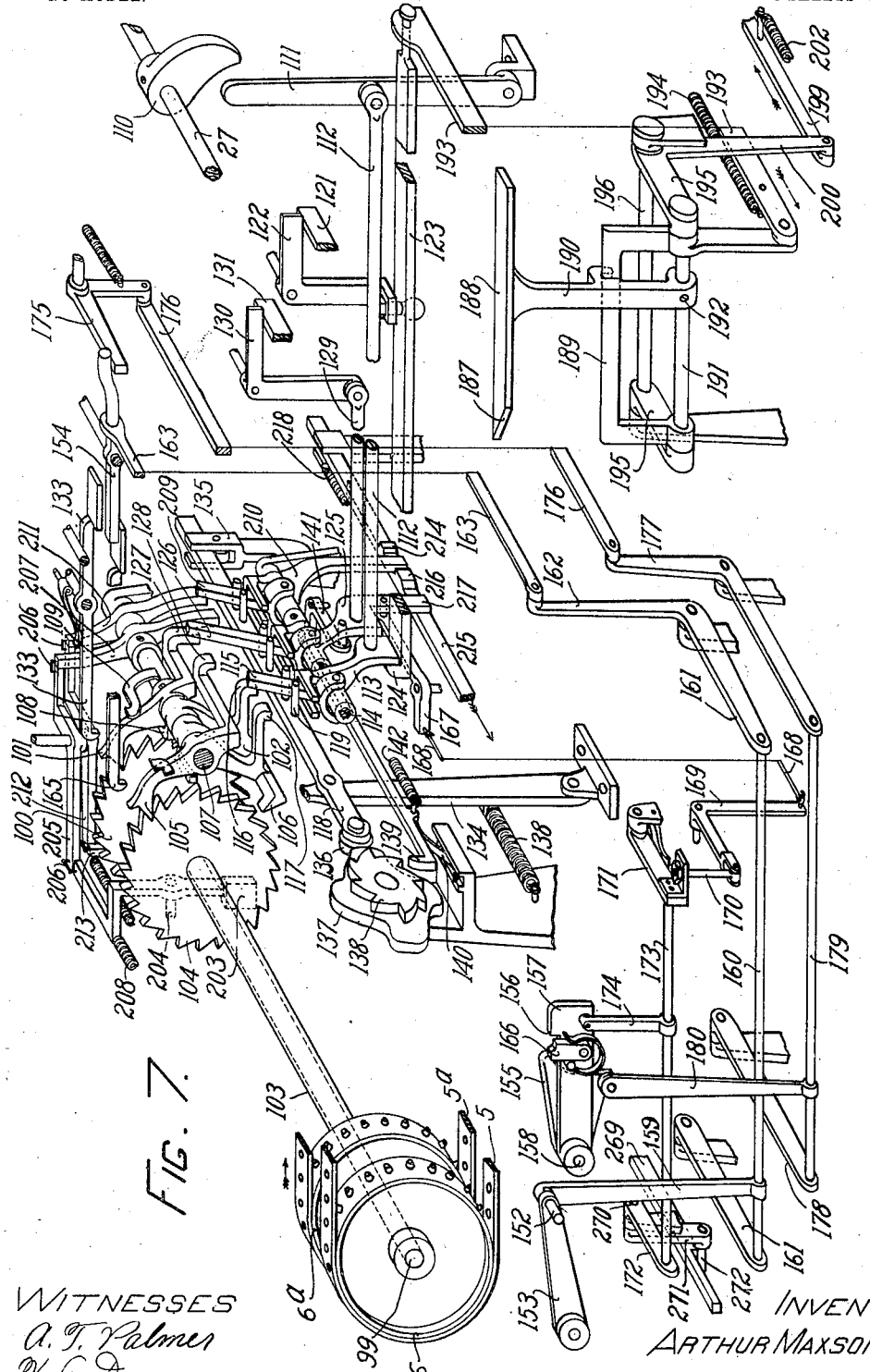
Figure 16:
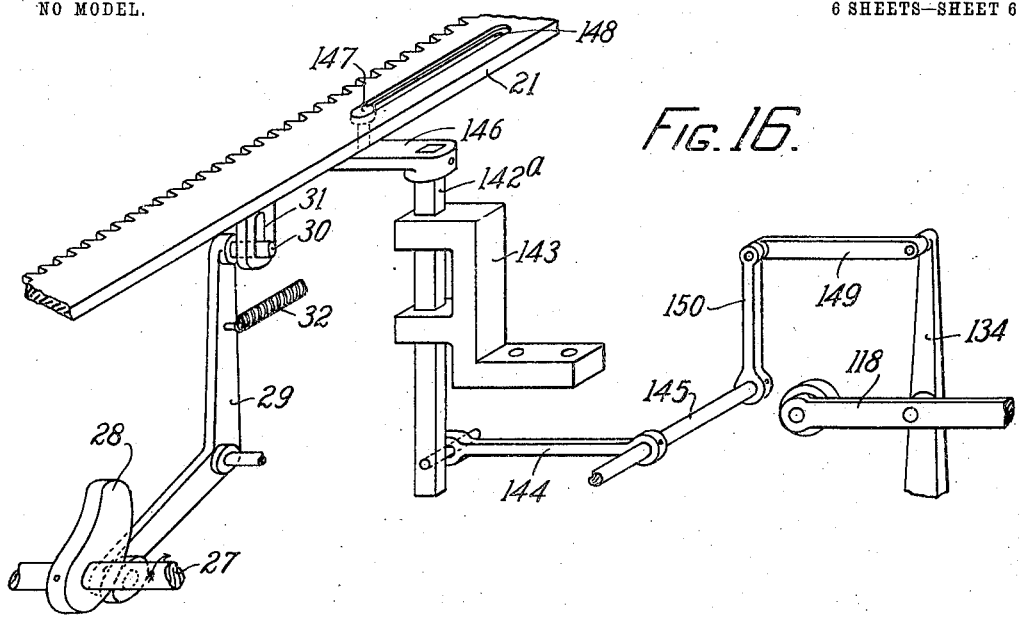
Figures 17, 18:
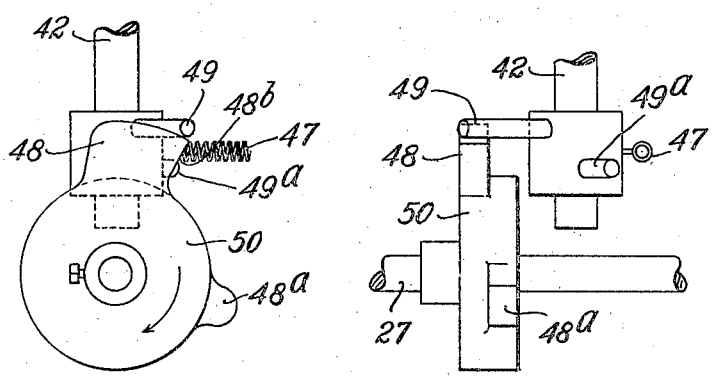
Figure 19:
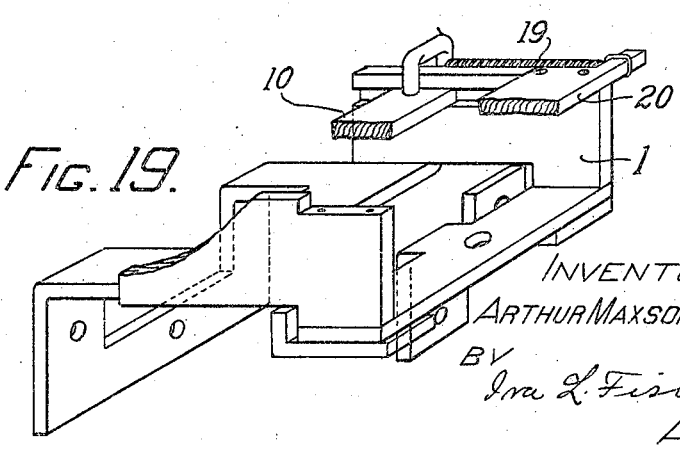

In the drawings, Figure 1 is a plan view, certain parts of the machine being omitted for the sake of clearness. Fig. 2 is a transverse sectional elevation with the type mechanism occupying a central position in the machine. Fig. 3 is an isometric view showing the mechanism for advancing the type-carriages and certain parts driven therefrom. Fig. 4 is a sectional detail of the spring-box and pawl at the right of Fig. 3. Fig. 5 is an isometric view showing a part of the mechanism for operating the platen-roll and also showing a type-carriage in initial position on its guiding-track. Fig. 6 is an isometric view showing a part of the connections between the type-keys and the type mechanism and also showing a portion of the guiding-track for the type-carriages. Fig. 7 is an isometric view illustrating the devices for controlling the movements of the type-carriages, certain parts being broken away and moved into a different plane for the sake of clearness. Fig. 8 is an isometric view showing in detail certain of the type-carriage-controlling devices arranged at the left end of the guiding-track. Fig. 9 is an isometric view of a cam-plate carried by one of the type-carriages. Fig. 10 is an isometric view showing a detail of the mechanism for controlling the position of the type-wheels. Fig. 11 is a detail plan view of a type-carriage, certain of the parts being omitted. Fig. 12 is an isometric view illustrating the parts shown in Fig. 11. Fig. 13 is a detail elevation of certain keys to be described. Fig. 14 is an elevation showing devices at the right-hand end of the platen-roll. Fig. 15 is a horizontal sectional view of the parts shown in Fig. 14. Fig. 16 is an isometric view showing the devices for operating the rack which controls the movements of the type-wheels toward and from the platen-roll. Figs. 17 and 18 are details of the mechanism for positioning the type-wheels. Fig. 19 is an isometric view showing the construction of the type-carriages.

The machine illustrated in the drawings is provided with two duplicate type mechanisms mounted in two type-carriages 1 1$^a$. These carriages are mounted to travel on an endless track 2 and are held in position on the track by flanged wheels 3 and rollers 4. The carriages are secured to endless bands 5 5$^a$, which pass around independent wheels 6 7 and 6$^a$ 7$^a$, arranged at opposite ends of the track. These wheels are provided with radial pins engaging holes in the bands, so that the carriages are positively connected with and controlled by the wheels. The wheels are rotated at the proper times and to the proper extent to advance the type-carriages along the line of printing and then return them to initial position by mechanisms which will be hereinafter described.

The type mechanisms in the form shown consist of type-wheels 8, carried by shafts 9, which are journaled in slides 10, mounted in the type-carriages. The type-wheels and the devices carried by the type-carriages which coöperate with them are substantial duplicates of each other and only one set of devices will be described in detail.

The shaft 9, which carries the type-wheel, is held in normal position in the slide 10 by means of a torsional spring 11, one end of which is secured to the slide and the other end of which is secured to the shaft. This spring tends to rotate the shaft in a direction to hold a radial pin 12, carried thereby in engagement with a stop-pin 13, depending from the slide 10, Fig. 1.

The shaft 9 is rotated against the tension of the spring 11 to bring the proper type on the type-wheel to the impression-point by means of a rack 14, arranged adjacent to the path of travel of the shaft 9 and in position to be engaged by a pinion 15, secured to said shaft. The slide 10 is normally held in such position in the type-carriage that the gear 15 is out of engagement with the arm 14, so that the type-wheel is free to move along the line of printing. When the type is to be positioned preparatory to making an impression, the slide 10 is moved to bring the gear 15 into engagement with the rack 14, and then the rack is moved to rotate the type-wheel, the extent of movement of the rack being determined by the depression of the key corresponding to the type character which is to make the impression in a manner which will be hereinafter described. After the type-wheel has been thus positioned the slide 10 is moved in the opposite direction to give the type-wheel an impression movement—that is to say, a movement which carries the type against the paper, so that an impression is made.

The movements of the slide 10 are produced or controlled by means of a cam 16, mounted on a stud 17, carried by the type-carriage. The slide is provided with a roll 18, engaging the cam, and is held against the cam by springs 19, connected to the slide 10 and to a plate 20, secured to the type-carriage, Figs. 1, 2, and 11. The cam is rotated to give the proper movements to the slide 10 by means of a rack 21, which extends along the path of travel of the type-carriage and is arranged to engage a pinion 22, loosely mounted on the stud 17. The pinion 22 is connected with the cam 16 through a series of pawls 23, carried by a disk 24, secured to the pinion, which engage a ratchet-wheel 25, secured to the cam. Through this connection the movement of the rack 21 toward the right in Fig. 1 causes a rotation of the cam 16 in the direction of the arrow, Fig. 11. During the return movement of the rack 21 and also during the travel of the type-carriage with relation to the rack the pawls ride idly over the ratchet-wheel, so that the type-wheel is unaffected by the return movement of the rack or the travel of the pinion 22 along the rack during the advance of the type-carriage.

The pinions 22 on the two type-carriages are arranged in different planes, and the rack 21 is so mounted that it may be raised or lowered, so as to coöperate with either pinion, according to the type mechanism which is in active operation. The mechanism for raising and lowering the rack 21 will be hereinafter explained.

The movements of the racks 21 and 14, and consequently the operation of the type mechanism, is dependent upon the operation of one of a bank of operating-keys, arranged in convenient position to be manipulated by the operator in the manner usual in type-writing machines. These keys are carried by a series of levers, one of which, 26, is indicated in Figs. 1 and 2. The depression of a key 26 throws into action the devices which position the type-wheel to bring the corresponding type character to the impression-point and also throws into action the mechanism for operating the type-wheel to make the impression, Figs. 2 and 16. The rack 21 is operated when a key is depressed through the rotation of a shaft 27, carrying a cam 28, which engages one end of a lever 29, the other end of which is connected with the rack by means of the pin 30, which plays in a slot 31, formed in a lug depending from the rack. The lever is held in engagement with the cam by means of a spring 32. The shaft 27 is acted upon by a spring or other suitable means which tends to constantly rotate it and is normally held from rotation by a trip-pawl 32, which engages a lug 33, projecting from a disk 34, secured to the shaft, Figs. 2 and 6. The means shown for rotating the shaft 27 consists of a spring mounted in a spring-box, (indicated at 35, Fig. 1,) which spring may be wound and held under tension by a pawl and ratchet, (indicated at 36.)

The trip-pawl 32 is operated to release the shaft 27 when a key is operated by means of a rock-frame 37, which overlies the rear ends of the keys and is secured to a rock-shaft 38, connected with the trip-pawl by an arm 39, Fig. 6. The frame 37 overlies the rear ends of all the keys 26, so that the pawl 32 is operated by the depression of any one of the keys and the shaft 27 thus released.

The depression of a key 26 also sets a device which determines the extent to which the rack 14 is to be moved in order to position the corresponding type character on the type-wheel at the impression-point. The devices for determining the positioning movement of the type-wheel consist of a series of stop-pins 40 and an arm 41, projecting radially from a rock-shaft 42, which is connected with the rack 14 by means of a toothed segment 43, which engages rack-teeth 44 on the rack 14, Figs. 1 and 2. The stop-pins 40 are mounted in a fixed plate 45 and are so arranged that each key-lever 26 will act upon a corresponding stop-pin. The stop-pins are held in normal position by springs 46, and when in this position the upper ends of the pins are directly below the plane of the arm 41. The rock-shaft 42, to which the arm 41 is secured, is acted upon by a spring 47, which tends to rotate it in the direction of the arrow, Fig. 1. The shaft 42 is held in normal position against the tension of the spring 47 by means of a cam 48, which is engaged by a pin 49, projecting from the shaft 42, Figs. 2, 17, and 18. The cam 48 is formed on a disk 50, secured to the shaft 27, and when the shaft is in normal position the cam is in position to be engaged by the pin 49 and to prevent movement of the shaft 42 under the influence of the spring 47. When the shaft 27 is released by the depression of a key, the rotation of the shaft carries the cam 48 out of the path of the pin 49, so that the shaft 42 is free to rotate under the influence of the spring 47 until its rotation is arrested by the engagement of the arm 41 with the stop-pin 40, which was raised by the depression of the key.

As has been before stated, the pinion 15, through which the type-wheel is connected with the positioning mechanism, is normally out of engagement with the rack 14, so that the type mechanism is normally disconnected from the positioning mechanism. The gear 15 should therefore be engaged with the rack 14 before the rock-shaft 42 is released, and the cam 48 is therefore so shaped that it does not release the shaft 42 until the shaft 27 has been rotated sufficiently to give the cam 16 a quarter-revolution. During this movement of the cam 16 the roller 18 rides up onto the high part of the cam, so that the slide 10 is moved toward the rack 14, bringing the pinion 15 into mesh with the rack 14. The cam 48 then releases the shaft 42, and the type-wheel is rotated until the movement of the rock-shaft 42 is arrested by the engagement of the arm 41 with one of the stop-pins 40. After the type-wheel has been positioned the continued rotation of the shaft 27 completes the rotation of the cam 16. During this movement of the cam 16 the roll 18 rides off the high part of the cam, thus releasing the plate 10, so that the springs 19 move the slide suddenly forward to give the type-wheel its impression movement. The continued rotation of the cam 16 then immediately returns the slide and type-wheel to normal position, where the roll 18 rests in a depression in the cam and acts to hold the cam against rotation as the pawls 23 drag over the ratchet-wheel 25 during the return movement of the rack 21 and the movement of the type-carriage along the line of printing.

When the type-wheel is given its impression movement, the pinion 15 is moved away from the rack 14, so that the type-wheel is no longer held in the position to which it has been moved by the engagement of the pinion and rack. In order to maintain the type-wheel in position until the impression has been made, means are provided for preventing rotation of the type-wheel during its impression movement. This means in the construction shown consists of a series of radial guiding-surfaces 51, formed on a disk 52, secured to the type-wheel and arranged to coöperate with a stop-lug 53, mounted on the type-carriage, Figs. 1, 11, and 12. The lug 53 is carried on an arm 54, pivoted to the plate 20 and pressed upward by a leaf-spring 55. The lug is held normally below the disk 52 by means of a cam 56, secured to the upper end of a rock-shaft 57. An arm 58 is secured to the rock-shaft below the plate 20 and is held in engagement with the cam 16 by a leaf-spring 59. When the cam 16 is rotated, the arm 58 rides on the high part of the cam during the time that the gear 15 is being engaged with the rack 14 and also while the type-wheel is being positioned. After the type-wheel has been positioned the arm 58 passes off the high part of the cam 16, so that the cam 56 is rotated in the direction of the arrow, Fig. 12. This movement of the cam brings a recess 60 above the end of the arm 54, so that said arm is raised, thus bringing the lug 53 up into the path of one of the guiding-surfaces 51. This movement of the lug 53 takes place before the roll 18 rides off the high part of the cam 16 and while the gear 15 is still in engagement with the rack 14. The lug remains in this position during the impression movement of the type-wheel, and during this movement the surface 51 rides against the lug 53, so that the type-wheel is accurately held in position during its impression movement. The guiding surfaces and lug not only prevent the return of the type-wheel after is has been positioned, but they act to accurately position the type-wheel and maintain it in position during the impression in case of any inaccuracy in the positioning mechanism. In other words, the accurate registering or positioning of the type character at the impression-point is not dependent upon an accurate and fine adjustment of the positioning mechanism which moves the type character into position at the impression-point. As the cam 16 completes its rotation, the arm 58 is operated to return the cam 56 to normal position, thereby depressing the lug 53 and releasing the type-wheel, so that it is returned to normal position by the coiled spring 11.

The means for making the impression should not be operated until the means for positioning the proper type character at the printing-point has completed its operation, and I have accordingly provided devices which render the operation of the impression-making means dependent upon the completion of the operation of the positioning means. This feature of invention may be used with advantage in various forms of type-writing machines in which the means for causing an impression to be made is controlled by the operation of the keys which position the type character, the form of the means for rendering the impression-making means dependent upon the positioning means being varied to suit the particular form of impression making and positioning means employed.

The means which I have employed for rendering the impression-making means dependent upon the operation of the positioning means consists of a trip-pawl 61, Figs. 6 and 10, arranged in the path of the lug 33 and connected with the positioning mechanism so that it is moved out of the path of the lug 33 as the positioning mechanism completes its operation. The trip-pawl 61 is in the form of a lever pivoted at 62 and is connected by a pin 63 with the hub 64 of a plate 65, which is loosely mounted on the shaft 42. The trip-pawl and plate 64 are held in normal position by means of a spring 65$^a$, which acts to hold a lug 66 on the lever 61 in engagement with a fixed part of the frame, Fig. 10. The plate 65 is provided with a series of holes which form the upper bearings for the stop-pins 40, Fig. 2. The pins 40 have a slight play in the plate 45, so that they may move to a limited extent when engaged by the arm 41, and thus move the plate 65 sufficiently to withdraw the pawl 66 from the path of the lug 33. The movement of the pawl and of the plate 65 is limited by a fixed stop 67, with which the pawl is engaged by the movement of the plate 65. When the shaft 27 is released by the depression of a key, the rotation of the shaft will be arrested by the pawl 61 in case the arm 41 has not been arrested by one of the stop-pins 40 before the lug 33 engages the pawl 61. The pawl 61 is so arranged that it will arrest the rotation of the shaft 27 before the roll 18 on the slide 10 passes off the high part of the cam 16, and the pawl therefore acts to prevent the impression movement of the type-wheel until the rotation of the type-wheel has been arrested by the engagement of the arm 41 with one of the stop-pins 40. The impression movement of the type-wheel cannot therefore take place until the type-wheel has been properly positioned.

The parts are so proportioned and arranged that the shaft 27 makes one revolution for each impression of a type character, and this shaft should therefore be so controlled that it will make but a single revolution for each depression of a type-key. In order to prevent a repetition of an impression upon a single depression of a key, I have provided means for arresting the rotation of the shaft 27 after a single impression has been made in case the key has not at such time been returned to normal position. This means consists of a stop-pawl 68, mounted upon the pivot, Fig. 6, of the trip-pawl 32 and connected therewith by a spring 69 and a projecting lug 70, which engages the trip-pawl 32. When the pawl 32 is operated to release the shaft 27, the stop-pawl 68 is brought into the path of the lug 33, so that the shaft will be arrested by the pawl 68 after the impression movement of the type-wheel has been completed, unless the pawl 32 has already been returned into the path of the lug 33. In case the shaft is arrested by the pawl 68, the movement of the pawl 32 into normal position will move the stop-pawl 68 out of engagement with the lug 33, so that the shaft may complete its rotation and come into normal position with the lug 33 against the trip-pawl 32.

The shaft 42 and attached arm 41 are returned to normal position after they have operated to position the type-wheel by the action of the cam 48 and a cam 48$^a$ on the pins 49 and 49$^a$, Figs. 17 and 18. If the arm 41 has moved through only a small arc, the return of the arm to normal position will be effected by the engagement of the cam-surface 48$^b$ with the pin 49 as the shaft 27 completes its rotation. If the arm 41 has moved through an arc sufficient to carry the pin 49 out of the path of the cam-surface 48$^b$, then the cam 48$^a$ will act on the pin 49$^a$ to partially return the shaft and arm, after which the cam 48$^b$ will complete the return movement.

It is frequently desirable to make repeated impressions of the same type character, and in order that this may be done rapidly and without requiring repeated operations of the type-key I have provided means for causing repeated impressions of a type character without repeating the operation of the corresponding type-key. The means which I have employed for this purpose consists of a lever 71, provided with a cam-surface 72, arranged to act upon the rear end of the stop-pawl 68 and hold said pawl out of the path of the lug 33. The spring connection between the stop-pawl 68 and the trip-pawl 32 enables the stop-pawl 68 to be thus operated, while the trip-pawl 32 is held out of the path of the lug 33 by the type-key which is depressed. The lever 71 is operated to cause repeated impressions of the same type character by depressing a key 73, connected to a rock-shaft 74, to which is secured an arm 75, arranged to engage the end of the lever 71, as indicated in Fig. 6. The lever 71 is held in normal position by a spring 76.

It is desirable that when a key is depressed it should not be returned to normal position until the impression of the corresponding type character has been completed, and I have accordingly provided means for preventing the return of the type-keys to normal position until the corresponding impression is completed. The means which I have employed for this purpose consists of a series of latches, one of which is indicated at 77, Fig. 6. There are a series of these latches corresponding to the type-keys, and they are loosely pivoted upon a rock-shaft 78 and are so arranged that they rest against the ends of the key-levers or against shoulders formed thereon. The latches 77 are provided with projecting arms 79, which overlie a bar 80, secured to the rock-shaft 78. An arm 81 projects rearwardly from the rock-shaft 78 and is provided with a laterally-projecting pin 82, arranged in the path of a pin 83, projecting from the cam-disk 50. The rock-shaft and bar 80 are held in normal position by a spring 84. When a type-key is depressed, the corresponding latch 77 drops forward under the key-lever and prevents the return of the key-lever to normal position until the latch is disengaged from the lever. The latch is disengaged after the impression has been completed by the action of the pin 83 upon the pin 82. As the pin 83 rides against the pin 82 the arm 81 is depressed, thereby rocking the bar 80 against the arm 79 and returning the latch to its normal position, thus releasing the key-lever, the depression of which released the shaft 27.

After each impression the type-carriage, which is operatively connected with the type-keys, is moved a step forward along the line of writing to properly space the successive impressions. This movement is imparted to the carriage by the rotation of the wheel 7 or the wheel 7$^a$, as the case may be. The wheels 7 and 7$^a$ are acted upon by devices which tend to rotate them in a direction to advance the type-carriages along the line of writing and the movement of the carriages is controlled by spacing mechanisms connected with the wheels 6 6$^a$, respectively.

The devices which I have employed for operating the wheels 7 7$^a$ to advance the carriages are shown in Fig. 3. The wheel 7 is secured to the end of a shaft 85, which is connected, through gears 86 87, with a shaft 88. The shaft 88 is acted upon by a spring 89, one end of which is secured to the shaft and the other end of which is secured to a spring-box 90, secured to a short shaft 91, arranged in line with the shaft 88 and provided with a reduced end 92, fitting within a recess in the end of shaft 88 and forming a bearing for said shaft. A ratchet-wheel 93 is secured to the spring-box 90 and is engaged by a pawl 94. By turning the shaft 91 the spring may be wound up, so that it will tend to constantly rotate the shaft 80, and the spring is held under tension until unwound by the rotation of the shaft 80 by the pawl 94. The spring 89 therefore acting through the shaft 88 and gearing 86 87 tends to constantly rotate the wheel 7.

The wheel $7^a$ is secured to the end of a hollow shaft 95, surrounding the shaft 85 and provided with a gear 96, engaging a gear 97, loosely mounted on the shaft 88. The gear 97 is connected with the shaft 88 by a coiled spring 98, one end of which is secured to the gear and the other end of which is secured to the shaft. The tension of this spring 98 tends to constantly rotate the wheel $7^a$ in a direction to advance the type-carriage $1^a$ along the line of writing. The spring 98 is so arranged that the rotation of the shaft 88 in rotating the wheel 7 winds up or increases the tension upon the spring 98. The spring 98 therefore is tensioned during the time that the carriage 1 is being advanced and then acts to advance the carriage $1^a$ while the carriage 1 is out of action.

The spacing mechanisms for causing the type-carriages to move along the line of writing the proper distance after each impression are shown in Fig. 7. The wheel 6 is secured to a shaft 99, to the rear end of which is secured a scape-wheel 100. This scape-wheel is acted upon by escapement-pawls 101 102, Figs. 2 and 7, which are so arranged that upon each operation of the pawls the scape-wheel is advanced a tooth-space. The wheel $6^a$ is secured to a hollow shaft 103, surrounding the shaft 99 and carrying at its rear end a scape-wheel 104, similar to scape-wheel 100 and operated upon by escapement-pawls 105 106, similar to the escapement-pawls 101 and 102. The spacing mechanisms for the type-carriages are independent of each other, and one of the mechanisms remains idle while the other is in operative connection with the type-keys. In Figs. 2 and 7 the mechanism for operating the spacing mechanism is shown in position to act upon the spacing mechanism for the type-carriage 1— that is to say, in these views the escapement-pawls 101 and 102 are in operative connection with the type-keys. The escapement-pawls 101 and 102 are pivoted upon a stud 107. The pawl 102 is provided with a laterally-projecting arm 108, which engages the front of pawl 101, so that the pawl 101 is moved away from the scape-wheel 100 as the pawl 102 moves toward the wheel. The pawl 101 is held yieldingly in engagement with the arm 108 by a leaf-spring 109. While the type-carriage 1 is being spaced along the line of printing the pawls 101 and 102 move in unison, so as to cause the wheel 100 to move forward a tooth-space at each operation of the pawls. When the carriage 1 is to be returned to initial position, the pawl 101 is operated independently of the pawl 102, so that neither pawl is in engagement with the wheel 101. When both pawls are thus disengaged from the wheel, the type-carriage is moved continuously along the track 2 until its movement is arrested by reëngagement of the pawl 101 with the wheel 100 or by some other means.

The spacing mechanism is operated after each impression by means of a cam 110, secured to the shaft 27, and so arranged that it operates the spacing mechanism after the impression has been completed and just before the shaft 27 completes its rotation. The cam 110 is arranged to act upon a lever 111, which is connected by a rod 112 with a rock-arm 113, pivoted on a stud 114, Fig. 7. An operating-arm 115 is pivoted to the hub of the rock-arm 113 and is arranged to engage a tailpiece 116, projecting from the pawl 102. When the cam 110 operates the lever 111, the arm 115 rocks the pawls 101 and 102 to space the type-carriage.

The pawl 106 of the spacing mechanism for the type-carriage $1^a$ is provided with a rearwardly-projecting tailpiece 117, arranged adjacent to the tailpiece 116 of the pawl 102, and the operating-lever 115 is so arranged that it may be shifted into position to operate upon either the pawl 102 or the pawl 106. The means for thus shifting the arm 115 consists of a shift-bar 118, provided with pins 119, arranged on opposite sides of the arm 115. This bar is shifted automatically at the proper times by a mechanism which will be hereinafter described.

For the purpose of spacing the type-carriage between words or at other times at the will of the operator a spacing-key 120 and connections between said key and the rock-arm 113, which operates the spacing mechanism, are provided. This key is carried by a lever 121, the rear end of which, Fig. 7, is arranged to engage and operate a bell-crank lever 122. A bar 123 is connected with the lever 122 and is provided with a shoulder 124, which lies back of the rock-arm 113, so that the movement of the bar 123 by the operation of the spacing-key lever 121 operates the spacing mechanism.

In the operation of the machine one or the other of the type mechanisms is always in operation and the other type mechanism is either being returned to initial position or is standing at initial position ready to be brought into action. When the type mechanism which is in action is to be dismissed, the pawl 101 (or 105) is operated independently of the pawl 102, so that both pawls are disengaged from the scape-wheel 100. The mechanism for thus operating the pawl 101 consists of a rock-arm 125, pivoted on the stud 114 and provided with an operating-arm 126, which is pivoted thereto and arranged to engage a tailpiece 127, projecting from the pawl 101. The pawl 105 is provided with a similar tailpiece 128, so arranged that the operating-arm 126 may be shifted into position to engage therewith. The arm 126 is connected with the shifting bar 118 by means of pins arranged on opposite sides of the arm. The rock-arm 125 is connected, by means of a rod 129, with a bell-crank lever 130, one arm of which is arranged to be engaged by the rear end of a lever 131, to the front end of which is secured a dismiss-key 132. When the dismiss-key 132 is depressed, the rock-arm 125 is rocked, thereby forcing the arm 126 against the tailpiece 127 of the pawl 101 and disengaging said pawl from the scape-wheel 100. This movement of the pawl 101 carries it into position to be engaged by a latch 133. The latch 133 holds the pawl 101 out of engagement with the scape-wheel 100 until the latch is operated to release the pawl by mechanism which will be hereinafter described.

The operation of the rock-arm 125 to dismiss the active carriage so that it may be returned to initial position also causes the shift-bar 118 to be operated to bring the operating-arm 115 into position to operate the spacing mechanism of the carriage 1ª and brings the operating-arm 126 into position to cause the dismissal of this carriage 1ª upon the next operation of the dismiss-key. The mechanism which I have employed for thus operating the shift-bar is shown in Fig. 7. The bar 118 is pivoted near its forward end to a lever 134 and is guided near its rear end in a support 135. The bar carries a roller 136, which is held in engagement with a cam 137 by a spring 138, connected with the lever 134. The cam 137 is secured to a ratchet-wheel 138, arranged to be operated upon by a pawl 139. The pawl is supported upon a leaf-spring 140 and is connected, by means of a bell-crank lever 141, with the rock-arm 125, the operation of which causes the dismissal of the active type mechanism. The pawl 139 is held in normal position by a spring 142. When the arm 125 is rocked to effect the dismissal of the active type mechanism, the pawl 139 is advanced into position to engage a tooth of the ratchet 138, the spring 140 yielding to allow the end of the pawl to pass over the tooth. When the rock-arm 125 returns to normal position, the pawl 139 acts to advance the ratchet 138 and the cam 137 a tooth-space. This movement of the cam brings a depression opposite the roller 136, so that the shift-bar 118 is moved to bring the arms 115 and 126 into position to engage the tailpieces 117 and 128. On the next operation of the rock-arm 125 the pawl 139 advances the ratchet and cam another tooth-space, bringing a high part of the cam opposite the roll 136 and shifting the shift-bar 118 into the position shown in Fig. 7.

When an active carriage is dismissed and the idle carriage brought into action, the rack 21 is shifted to bring it into position to engage with the pinion 22 on the carriage, which is brought into action. The devices which I have employed for thus shifting the rack 21 are best shown in Fig. 16. The rack is supported upon bars 142ª, guided in brackets 143 and supported by arms 144, secured to a rock-shaft 145. The bars 142ª are provided with laterally-extending plates 146, upon which the rack 21 rests, and the rack is connected with these plates by means of pins 147, playing in slots 148 in the rack. The rock-shaft 145 is operated to raise and lower the rack 21 by the movements of the shifting bar 118. The shift-bar is connected with the rock-shaft 145 by means of a link 149, which connects the upper end of the lever 134, to which the bar 118 is pivoted with an arm 150, secured to the rock-shaft 145. By these connections the shifting of the bar 118, which brings the spacing mechanism of a carriage into operation, also shifts the rack 21 into position to engage the pinion 22 of the corresponding carriage.

As has already been explained, the operation of the dismiss-key when the parts are in the position shown in Fig. 7 disengages the pawl 101 from the wheel 100 and engages it with the latch 133. The type-carriage 1 is then advanced continuously along the track 2 until it is returned to initial position. In order that the movement of the type-carriage may be arrested when the carriage arrives in proper position without strain or wear upon the spacing mechanism, I have provided a stop for determining the initial position of the carriage. I have also provided means for automatically effecting the reëngagement of the spacing-pawl 101 with the wheel 100 when the type-carriage comes into initial position. These devices are shown in Figs. 5, 7, and 8. As the type-carriage comes into writing position at the left side of the machine a cam 151 on the carriage, Fig. 8, acts upon a pin 152, projecting laterally from a lever 153 and raises said lever. This movement of the lever 153 shifts a rock-arm 154, Fig. 7, into position above the rear end of the latch 133. The continued movement of the carriage after the lever 153 has been operated brings the front end of the carriage against a cam-lever 155, so that said lever is depressed. The depression of this lever causes the rock-arm 154 to be operated, thus disengaging the latch 133 from the pawl 101, so that said pawl reëngages the wheel 100. As the cam-lever 155 is thus operated by the carriage to reëngage the spacing-pawl with the scape-wheel the front edge of the carriage brings up against a stop-shoulder 156, formed on an arm 157, pivoted on the stud 158, which carries the lever 155. The lever 153 is connected with the rock-arm 154 by means of a link 159, pivoted to the lever 153 at its upper end and having its lower end pivoted on a rod 160, which is mounted in rock-arms 161. One of the arms 161 is provided with an upwardly-extending arm 162, to the upper end of which is pivoted a bar 163, provided at its rear end with a eye through which the rock-arm 154 passes.

The connections between the cam-lever 155 and the rock-arm 154 comprise a bell-crank lever 175, one arm of which engages the arm 154 and the other end of which is connected by a link 176 with a second bell-crank lever 177. The bell-crank lever 177 forms a part of a rock-frame consisting of the bell-crank lever 177 and an arm 178, connected with the lever 177 by a rod 179. The rod 179 is connected with the cam-lever 155 by a link 180, the lower end of which loosely engages the rod 179 and the upper end of which is pivoted to the cam-arm 155.

The type-carriage 1ª is provided with a cam 164, Fig. 9, similar to cam 151 on the carriage 1, but so arranged that it will act to depress the pin 152 as this type-carriage comes into writing position. This movement of the pin 152 by the type-carriage 1ª acts through the connections described to shift the rock-frame 154 into position to engage the latch 165, which corresponds to the latch 133 and acts to hold the pawl 105 out of engagement with its scape-wheel while the type-carriage 1ª is being returned to initial position. The further movement of this carriage 1ª acts upon the cam-lever 155, and thus operates the rock-arm 154 to disengage the catch 165, so that the pawl 105 reëngages its scape-wheel 104. Thus each type-carriage as it come into initial position shifts the rock-arm 154 into position to engage the corresponding latch 133 or 165 and then operates the rock-arm to cause the reëngagement of the corresponding spacing-pawl and scape-wheel.

As a type-carriage comes into position against the stop-shoulder 156 of the arm 157 the front edge of the carriage acts against a spring-pressed pivoted dog 166, mounted on the arm 157, and rocks said dog out of normal position. The idle carriage remains in position against the stop-shoulder 156 until the active carriage is dismissed, when the stop-arm 157 is depressed, thus moving the stop-shoulder 156 out of the path of the carriage. This movement of the arm 157 carries the dog 166 below the type-carriage, so that it returns to normal position, where it will underlie the carriage and prevent a return of the stop-arm 157 until the type-carriage has passed from above the dog. The inactive type-carriage which stands at initial position is thus released and brought into action and left free to advance along the line of writing under the control of the spacing mechanism when the active carriage is dismissed. In order that the stop-arm 157 may be thus operated when an active carriage is dismissed, the arm is operated from the rock-arm 125, which forms a part of the dismiss mechanism. The connections between the rock-arm 125 and the stop-arm 157 comprises a bell-crank lever 167, one end of which is connected to the rock-arm 125 and the other end of which is connected by a link 168 with one arm of a second bell-crank lever 169. The other arm of the bell-crank lever 169 is connected by a link 170 with a rock-frame consisting of two arms 171 172, connected by a rod 173. A link 174 is loosely pivoted at its lower end upon the rod 173 and is connected at its upper end with the stop-arm 157.

The lever 153, cam-lever 155, and stop-arm 157 are mounted upon a bracket 181, which is secured to the track 2 by means of a bolt 182 and a stud 183, which extend through a slot 184, formed in the web connecting the upper and lower parts of the brake, Figs. 5 and 8. This manner of mounting these parts enables them to be adjusted to vary the initial position of the type-carriages to suit the character of work being done. The bracket 181 is held in adjusted position by means of a thumb-screw 185 on the end of the stud 183, Fig. 5. A scale 186 may be provided for indicating the adjustment of the parts. When the parts are adjusted, the links 157, 174, and 180 slide freely along the rods 160, 173, and 179 to accommodate the movement of the parts carried by the bracket 181.

The dismissal of the active carriage at the end of a line may depend upon the operation of the dismiss-key, as above described. The speed at which the writing may be performed may be increased, however, by providing means for automatically dismissing the carriage as it reaches the right margin of writing, so that the dismissal of the active carriage at such point does not require the attention of the operator. I have accordingly provided means for thus automatically dismissing the carriage. I have also so constructed this means that the dismissal of the active type-carriage will take place only after the completion of a word. I accomplish this latter result by providing means for connecting the dismiss mechanism with the spacing-key when the active type-carriage reaches a predetermined point in its travel along the line of writing. The devices for automatically dismissing the active carriage are shown in Fig. 7 and partially shown in Fig. 6. As the active type-carriage approaches the right margin of writing it engages a cam-surface 187 on the end of a plate 188 and moves said plate rearwardly. This plate is adjustably secured on a rock-frame 189, so that the plate may be adjusted to vary the point in the line where the dismiss mechanism is connected with the space-key. The plate 188 is of such length that it will be held in the position into which it is moved by the carriage while the carriage is being advanced through a distance sufficient to complete the longest word which is ordinarily written upon the machine. The movement of this plate by the active type-carriage causes a connection to be made between the spacing-key and dismiss mechanism, so that the active carriage is dismissed when the operator strikes the space-key after the completion of the word which is being written when the carriage engages the plate.

The plate 188 is provided with a depending arm 190, the lower end of which is secured to a rod 191, on which the rock-frame 189 is mounted. The arm 190 is held in adjusted position on the rock-frame by means of a set-screw 192. The rock-frame is connected by means of a link 193 with a bar 123, which forms a part of the connection between the space-key lever 121 and the rock-arm 113, through which the spacing mechanism is operated. When the plate 188 is moved by the type-carriage, the bar 122 is swung about the pivot by which it is suspended over the bell-crank lever 122, thus shifting the shoulder 124 at the end of the bar into position to engage and operate the rock-arm 125, which forms a part of the dismiss mechanism. When the bar 123 is thus shifted, the movement of the bar by the depression of the spacing-key will operate the dismiss mechanism instead of operating the spacing mechanism, thus causing a dismissal of the active type-carriage and also bring the inactive type-carriage into action. As soon as the type-carriage disengages the plate 188 the rock-frame 189 and connected plate are immediately returned to normal position by a spring 194, thus returning the bar 123 into position to engage the rock-arm 113, and thus connecting the spacing-key with the spacing mechanism.

In order to prevent any accidental or unintentional dismissal of a type-carriage which might occur in case the spacing-key were operated twice before the type-carriage had traveled sufficiently far to release the plate 188 or in case a type-carriage which had been dismissed by the operator were passing the plate 188 at the time the spacing-key were operated, I have provided means for removing the plate 188 from the path of the type-carriages as soon as a type-carriage is dismissed and returning said plate into operative position when said type-carriage has been returned to initial position. I have provided for this operation of the plate 188 by mounting the rock-frame 189 in arms 195, pivoted on a shaft 196, and providing means for operating said arms to depress the frame and plate 188 whenever either carriage is being returned to initial position. This means consists of two governors 197, connected by bell-crank levers 198 with a bar 199, which is also connected with a lever 200, projecting from one of the arms 195, Figs. 3 and 7. The governors 197 are connected with the shafts 85 and 95, through which the type-carriages are operated, by gearing 201, and these governors are so arranged that when either governor is continuously rotated the corresponding bell-crank lever 198 is operated to draw the bar 199 in the direction of the arrows, Figs. 3 and 7, and thus withdraw the plate 188 from the path of the type-carriages. Whenever either type-carriage, therefore, is dismissed and is moved continuously to return it to initial position, the plate 188 is removed from the path of the type-carriages and remains out of said path until the dismissed type-carriage comes to rest in initial position. When the type-carriage comes into this position, rotation of the corresponding governor ceases, and the plate 188 is returned to active position in the path of the type-carriages by a spring 202, Fig. 7.

In order to enable a type-carriage to be moved to any desired extent along the line of writing without requiring repeated operations of the spacing-key, I have provided means under the control of the operator for disconnecting and connecting the spacing mechanism of the active type-carriage at will. The devices which I have provided for accomplishing this purpose are shown in Figs. 1, 2, and 7.

When it is desired to space the active type-carriage for any given distance along the line of writing, the spacing-pawl 101 or 105, as the case may be, is disengaged from the corresponding scape-wheel, and the type-carriage is thus allowed to move continuously forward until it reaches the desired point, when the spacing-pawl is reëngaged with the wheel. Just before the pawl 105, for instance, is disengaged from its wheel 104 a friction-brake 203 is applied to the ratchet-wheel, and this brake is again applied to the ratchet-wheel just before the pawl is reëngaged with the ratchet-wheel, so as to avoid injury to the spacing mechanism when the movement of the type-carriage is arrested. The brake 203 is pivoted at 204 and is connected by a bell-crank lever 205 and links 206 with the upper end of a lever 207, pivoted on the stud 107. The brake is held normally out of engagement with the ratchet by a spring 208. The lower end of the lever 207 is arranged in position to be operated upon by an operating-arm 209, pivoted to the hub of a rock-arm 210, which is mounted on the stud 114. The operating-arm 209 is connected with the shift-bar 118 by means of two pins projecting on opposite sides of the arm, so that said arm may be shifted to operate upon the lever 207, which is connected with the brake 203, or into position to operate upon a similar lever 211, which is connected through a bell-crank lever 212 with a brake 213, similar to the brake 203, but arranged to operate upon the ratchet-wheel 100. By reason of the connection between the operating-arm 209 and the shift-bar 118 the arm is so controlled that it is always in position to operate the brake corresponding to the active carriage.

The rock-arm 211 is operated to apply the brake to the active ratchet-wheel by means of a cam 214, formed on a bar 215 and arranged to engage the lower end of the rock-arm. This bar is also provided with a cam 216, arranged to engage a projection 217, depending from the rock-arm 125 of the dismiss mechanism. When the bar 215 is moved in the direction of the arrow, Fig. 7, the cam 214 first operates the rock-arm 211 to apply the brake to the active scape-wheel, and then the cam 216 operates the rock-arm 125 to disengage the spacing-pawl 101 or 105 from its ratchet-wheel, the cam 214 in the meantime having released the rock-arm 210, so that the brake is returned to its normal position. The active type-carriage is now free to move continuously along the line of writing until the bar 215 is returned to normal position. When the return of the bar takes place, the cam 214 again operates the brake, and immediately thereafter the cam 216 disengages the projection 217 on the rock-arm 125, thus allowing the spacing-pawl to reëngage its scape-wheel. The cam 214 then releases the rock-arm 210, so that the brake again returns to normal position.

The movement of the rock-arm 125 by the cam 216 is not sufficient to engage the spacing-pawl with the latch 133, (or 165,) and consequently the spacing-pawl is free to return into engagement with the scape-wheel when the cam 216 returns to its normal position. Neither is the movement of the rock-arm 125 sufficient to withdraw the stop-lever 157 from engagement with the inactive type-carriage nor to operate the line-spacing mechanism which is connected with the dismiss mechanism, as will be presently explained.

The bar 215 is held in normal position by a spring 218, Fig. 7, and is operated by the depression of a key 219, Fig. 1, carried by the outer end of a lever 220, the rear end of which is arranged to engage and operate a bell-crank lever 221, connected with the bar 215, Fig. 2. When the active type-carriage is to be positioned along the line of writing, the key 219 is depressed, thus allowing the carriage to move continuously along the line of writing until the key is released, when the movement of the carriage is arrested.

The paper being written upon is supported upon a platen-roll 222 and is held in position thereon by a pressure-roll 223, Fig. 5. The platen-roll is journaled in a frame provided with end pieces 225, which are connected by a bar 226. The end pieces are mounted in guides 227, secured to a fixed part of the machine-frame, and the platen-supporting frame is held in normal position by springs 228, surrounding rods 229, which extend downward from flanges 230 on the end pieces 225. These springs are interposed between the flanges 230 and a fixed plate 231, Fig. 5.

In the construction shown the type-wheel is provided with three series of type characters arranged in different horizontal planes, and means are provided for moving the platen-roll vertically to bring it into proper register with either of the series of type characters. The means for thus moving the platen-roll consists of two keys 231 232, carried on the front ends of bell-crank levers 233 234, the rear ends of which are arranged to act against collars 235 236, secured to a link 237, which connects these bell-crank levers with an arm 238, secured to a rock-shaft 239. The rock-shaft is provided with two arms 240, one of which is shown in Fig. 2, which are provided with yokes arranged to engage projecting flanges 241 on the lower ends of the rods 229, which depend from the platen-roll frame. When one of the keys 231 or 232 is depressed, the arms 240 act to draw the platen-frame downward and hold it in position to register with either the second or third series of type characters on the type-wheels, according to the key which is depressed. When the key is released, the platen-frame immediately returns to its normal position, in which the platen-roll is in register with the upper series of type characters.

The platen-roller 222 is rotated to advance the paper a line-space by the mechanism shown at the left in Fig. 5. A gear 242 is secured to the trunnion of the platen-roll outside of the left-hand end piece 225 and is engaged by a pinion 243, secured to the upper end of a vertical shaft 244. The shaft 244 extends down through a sleeve 245, to which it is connected by means of a pin 246, projecting radially from the shaft through a slot 247 in the sleeve. The pinion 243 is held normally in position to engage the gear 242 by means of a spring 248, mounted within the sleeve 245 and holding the pin 246 in engagement with the upper end of the slot 247. A bevel-pinion 249 is secured to the sleeve 245 and is engaged by a similar bevel-gear 250, secured to a shaft 251, which carries a pinion 252, engaging a gear 253. The gear 253 is acted upon by a spring 254, which tends to rotate the gear in the direction of the arrow. One end of this spring is connected to the gear, and the other end is connected to the shaft on which the gear is mounted, so that the spring may be put under tension by turning the shaft. The spring is held under tension until unwound by the rotation of the gear 253 by means of a pawl 255, arranged to engage a ratchet-wheel 256, secured to the shaft.

Through the connections described the spring 254 tends to rotate the platen-roll in the direction of the arrow, Fig. 5. The rotation of the roll is controlled by escapement-pawls 257 258, arranged to coöperate with a scape-wheel 259, secured to the sleeve 248. These escapement-pawls are so arranged that the sleeve 245 is allowed to move forward a tooth-space at each operation of the escapement-pawls. This movement causes the platen-roll to be advanced a line-space. The escapement-pawls are pivoted upon a stud 260 and are connected by a spring 261, which holds the pawl 258 in engagement with a lug 262, projecting from the pawl 257. By reason of the connecting-spring and lug the pawl 258 will move in unison with the pawl 257 when the pawl 257 is operated. The pawl 258, however, may be operated independently of the pawl 257 to disengage both pawls from the scape-wheel in a manner to be more fully explained.

The escapement-pawls may be operated at the will of the operator to effect the line-spacing of the paper by means of a line-spacing key 263, carried at the front end of a lever 264, which is secured to a rock-shaft 265, Figs. 1 and 5. This rock-shaft carries a rearwardly-projecting arm 266, arranged to engage one end of a bell-crank lever 267, the other end of which is arranged to engage a pin 268, projecting laterally from a bar 269, which is pivotally connected to the pawl 257. At each depression of the line-spacing key 263 the escapement-pawls 257 and 258 are operated to effect a spacing movement of the platen-roll.

As has been explained, the machine shown is provided with means for automatically dismissing the active type mechanism and at the same time bringing the inactive type mechanism into action, and I have therefore also provided the machine with means for automatically effecting a line-spacing of the paper when an active type mechanism is dismissed. I accomplish this by connecting the line-spacing mechanism with the dismiss mechanism in the manner indicated in Figs. 5 and 7. This connection is effected through the devices which connect the stop-lever 157 with the dismiss mechanism. The arm 172, which carries one end of the rod 173, is secured to a rock-shaft 270, which carries an arm 271, provided with a laterally-projecting pin 272, upon which the bar 269 normally rests. The bar 269 is provided with a shoulder 273, arranged in the path of the pin 272, so that the movement of the arm 271, which occurs when an active carriage is dismissed, brings the pin 272 against the shoulder 273 and operates the pawls 257 and 258 to effect a spacing movement of the platen-roll.

In case it is desired to rotate the platen-roll independent of the operation of the spacing mechanism the pinion 243 may be depressed against the tension of the spring 248 to disengage the pinion from the gear 242. This may be done by means of a cam 274, formed on an arm 275, pivoted on the journal of the platen-roll and so arranged that the cam 274 will engage the upper end of the shaft 244 and depress the same when the arm 275 is swung about said journal.

In order that the arm 275 may be conveniently operated, a rod 275$^a$ extends from said arm longitudinally of the platen-roll, the opposite end of the rod being pivoted at 276 upon the right-hand journal of the platen-roll, as indicated in Figs. 14 and 15. The rod 275$^a$ and arm 275 are held in normal position by a spring 276$^a$, Fig. 5, which holds the rod 275$^a$ against a stop-pin 277$^a$, Fig. 14.

The paper is held against the platen-roll by a retaining-bar 277, extending longitudinally of the platen-roll and arranged above the line of writing. This bar is carried by pivoted arms 279$^a$, one of which is connected with the rod 275$^a$, as indicated in Fig. 5. The bar normally lies close to the surface of the platen-roll, so that it guides the paper and retains it against the platen along the line of writing. When the paper is to be inserted, this bar is raised by operating the rod 275$^a$ to enable the edge of the paper to pass, so that the paper may be quickly and conveniently inserted. This retaining-bar is also graduated, so that it forms a scale for coöperating with fingers 278$^a$ on the type-carriages in positioning a carriage at any desired point in the line. The combined scale and retaining-bar is arranged directly above the line of writing, and therefore covers the previously-written line. To enable the bar to be thus arranged and still allow a view of the written line, I make the bar of a suitable transparent material, such as celluloid.

If it is desired to vary the space between the lines of writing, this may be done by removing the pinion 243 and substituting therefor a pinion of different size. When this is done, the platen-roll should be moved axially to bring the gear 242 into proper relation with the shaft 244. This adjustment of the platen-roll is provided for by the adjustable connection between the platen-roll shaft and the frame which supports the platen-roll. (Shown in Figs. 14 and 15.) This connection consists of an L-shaped plate 278, one arm of which is provided with a hole for the passage of the platen-roll shaft 279 and lies between a collar 280 on said shaft and the end of a sleeve 281, which forms the right-hand trunnion of the platen-roll. The other arm of the plate 278 is provided with a slot 282, through which a thumb-screw 283 extends into the end piece 225 of the platen-roll frame. When the thumb-screw 283 is loosened, the platen-roll may be shifted axially into the desired position, after which the thumb-screw is tightened to secure the roll in adjusted position. The sleeve 281 is provided with a knurled head 284, by which the platen-roll may be rotated when disconnected from the line-spacing mechanism.

It may be desirable under some conditions— as, for instance, when a mistake has been made in a line of printing—to dismiss the active carriage without causing the spacing movement of the paper. I have accordingly provided means under the control of the operator for temporarily disconnecting the line-spacing mechanism from the dismiss mechanism. This means consists of a key 285, Fig. 1, carried by the front end of a lever 286, pivoted at 287, Fig. 5, and having its rear end arranged to engage the under side of the bar 269. When the key 285 is depressed, the lever 286 raises the bar 269, so that the shoulder 273 thereon is carried out of the path of the pin 272. With the bar 269 in this position the line-spacing mechanism will not be operated by the operation of the dismiss mechanism, and consequently an active type mechanism may be dismissed and the inactive type mechanism brought into action without effecting the line-spacing.

In order that the line-spacing mechanism may remain disconnected from the dismiss mechanism until the active carriage is dismissed without requiring that the operator hold the key 285 in depressed position, I have provided a latch 288 (shown in Fig. 13) for retaining the key 285 in depressed position. When the key 285 is depressed, the latch 288 engages a shoulder 289 and retains the key in depressed position until the latch is disengaged from the shoulder. After the line-spacing mechanism and dismiss mechanism have been disconnected they should be reconnected before the next dismissal of an active carriage by the operator. To accomplish this automatically, I provide the latch 288 with an extending arm 289, so arranged that it will be engaged and operated by the downward movement of the dismiss-key 132. I also provide such lost motion in the connections between the dismiss-key and the line-spacing mechanism that the latch 288 will be disengaged from the key 285 and the dismiss mechanism and line-space mechanism reconnected before the dismiss mechanism has been given sufficient movement to operate the line-spacing mechanism. In the construction shown I have provided this lost motion between the pin 272 and the shoulder 273 on the bar 269, as indicated in Fig. 5. When the operator wishes to make a correction or to rewrite a part of a line, he depresses the key 285, thus disconnecting the line-space mechanism and the dismiss mechanism, and then continues writing until the line is finished. When the active carriage is automatically dismissed at the end of the line and the inactive carriage brought into action, there is no spacing of the paper, since the key 285 is retained in its depressed position by the latch 288. The carriage which has just been brought into action may now be spaced along the line and operated in making the correction or rewriting a part of the line. After the correction has been made the operator in dismissing this carriage reconnects the dismiss mechanism with the line-spacing mechanism, so that the paper is spaced ready for the writing of the next line.

In order that the platen-roll may be rotated continuously to feed the paper any desired distance or to quickly remove the paper from the machine, I have provided means for disengaging both spacing-pawls and reëngaging them at will. This means is indicated in Fig. 5, wherein certain parts are shown out of their true position for the sake of clearness. When the spacing-pawl 258 is disengaged from the wheel 259, a brake is applied to the platen-roll prior to the disengagement of the pawl and is reapplied just prior to the reëngagement of the pawl, so that the platen-roll may be brought to rest without jar or injury to the spacing mechanism. This brake consists of a strap 290, passing around the left end of the platen-roll and having one end secured to the platen-roll frame and the other end secured to one end of a bell-crank lever 291. The pawl 258 is disengaged from the wheel 259 by the operation of a key 292, carried by the end of a lever 293, which is secured to a rock-shaft 294, Figs. 1 and 5. The rock-shaft 294 carries an arm 295, which is connected by means of a link 296 with the pawl 258. The rock-shaft 294 also carries an arm 297, arranged to operate upon a cam 298, formed on the bell-crank lever 291, to which the brake-strap is secured. When the key 292 is depressed, the arm 297 first acts upon the cam 298, thus operating the bell-crank lever 291 to apply the brake to the platen-roll. The continued movement of the rock-shaft disengages the pawl 258 from the ratchet 259, and also carries the arm 297 out of engagement with the cam 298, so that the platen-roll is free to rotate under the influence of the spring 254. The platen continues to rotate until the key 292 is released and returns to normal position. In the return movement of the key a rock-shaft 294 and arm 297 first operates upon the cam 298 to apply the brake-strap to the platen-roll, and then the pawl 258 is reëngaged with the scape-wheel 259, the arm 297 disengaging the cam 298 and relieving the strain on the brake-strap after the pawl 258 is engaged with the wheel.

The type upon the type-wheels are inked by means of inking-rolls, (indicated at 299, Fig. 5,) the rolls being supported in the type-carriages and pressed against the type characters by springs 300.

What I claim, and desire to secure by Letters Patent, is—

1. In a type-writing machine the combination of a type mechanism mounted to travel in an endless path, and means for intermittently advancing said mechanism along the line of writing.

2. In a type-writing machine the combination of a type mechanism mounted to travel in an endless path, means for advancing said mechanism automatically upon its operation and independently thereof at will.

3. In a type-writing machine the combination with a stationary keyboard, of a type mechanism mounted to travel in an endless path, and means for advancing said mechanism along the line of writing.

4. In a type-writing machine the combination of a stationary keyboard, a type mechanism mounted to travel in an endless path, and intermediate devices for operating and advancing said type mechanism along the line of writing.

5. In a type-writing machine the combination with a stationary keyboard, a type mechanism mounted to travel in an endless path, intermediate devices for operating said type mechanism, and means for advancing said mechanism by operating the same and independently thereof at will.

6. In a type-writing machine the combination of a type mechanism mounted to travel in an endless path, means for operating said type mechanism and advancing the same along the line of writing, and means for returning said type mechanism to initial position.

7. In a type-writing machine the combination of a type mechanism mounted to travel in an endless path, means for operating said type mechanism and for advancing the same by operating said type mechanism and independently thereof at will, and means for returning said type mechanism to initial position.

8. In a type-writing machine the combination of a plurality of type mechanisms mounted to travel along the line of writing, and means for rendering them successively active.

9. In a type-writing machine the combination of a plurality of type mechanisms mounted to travel along the line of writing, and means for automatically rendering them successively active.

10. In a type-writing machine the combination of a plurality of type mechanisms, and means for rendering them successively active automatically and at will.

11. In a type-writing machine the combination with a paper-support of a plurality of independent type mechanisms mounted to travel along the line of writing, and means for operating said type mechanisms.

12. In a type-writing machine the combination with the paper-support, of a plurality of independent type mechanisms mounted to travel along the line of writing, and means for alternating the writing operations thereof.

13. In a type-writing machine the combination with the paper-support stationary with respect to the line of writing, of a plurality of independent traveling type mechanisms, and means for operating said type mechanisms.

14. In a type-writing machine the combination with a paper-support stationary with respect to the line of writing, of a pair of independent traveling type mechanisms, and means for alternating the writing operation thereof.

15. In a type-writing machine the combination with a paper-support, of a plurality of alternately working and idle type mechanisms, and means for making the operation of writing substantially continuous through the employment of first one and then another of said mechanisms.

16. In a type-writing machine the combination with a paper-support, of a pair of alternately working and idle type mechanisms, and means for making the operation of writing substantially continuous through the employment of first one and then another of said mechanisms.

17. In a type-writing machine the combination with a paper-support, of a plurality of type mechanisms mounted to travel along the line of writing, a keyboard, and means for bringing said type mechanisms successively into operative connection with said keyboard.

18. In a type-writing machine the combination with a paper-support, of successively operable and operatively interchangeable type mechanisms mounted to travel along the line of writing.

19. In a type-writing machine the combination with a paper-support stationary with respect to the line of writing, of alternately operable and operatively interchangeable type mechanisms.

20. In a type-writing machine the combination with a paper-support, of alternately idle and working and operatively interchangeable type mechanisms mounted to travel along the line of writing.

21. In a type-writing machine the combination with a paper-support, of independently operating type mechanisms, and means for making said type mechanisms interchangeably operative.

22. In a type-writing machine the combination with a paper-support stationary with respect to the line of writing, of independently operating type mechanisms, and means for making said type mechanisms interchangeably operative.

23. In a type-writing machine the combination with a paper-support, of independently operating type mechanisms mounted to travel along the line of writing, and means for making said type mechanisms automatically interchangeable in operation.

24. In a type-writing machine the combination of a paper-support, stationary with respect to the line of writing of independently operating type mechanisms, and means for making said type mechanisms automatically interchangeable in operation.

25. In a type-writing machine the combination of a paper-support, type mechanisms mounted to travel along the line of writing, and means for making said mechanisms regularly successive in operation.

26. In a type-writing machine the combination with a paper-support, of type mechanisms mounted to travel along the line of writing, and means for making said mechanisms regularly successive in operation automatically and at will.

27. In a type-writing machine the combination with a paper-support, of independent type mechanisms mounted to travel in an endless path, and means for successively bringing said mechanisms under control of the type-actuating means.

28. In a type-writing machine the combination with a paper-support, of independent type mechanisms, operating means, and means for dismissing the active mechanism and bringing another into action whereby the operation of writing may be substantially continuous.

29. In a type-writing machine the combination with a paper-support, of two independent type mechanisms, operating means, and means for dismissing the active mechanism and thereby bringing the other mechanism into action whereby the operation of writing may be substantially continuous.

30. In a type-writing machine the combination with a paper-support, of independent type mechanisms mounted to travel in an endless path, operating means, and means for dismissing the active mechanism and bringing another under control of the operating means, whereby the operation of writing may be substantially continuous.

31. In a type-writing machine the combination with a paper-support, of successively operable and operatively interchangeable type mechanisms, and means for controlling said mechanisms to make the operation of writing substantially continuous.

32. In a type-writing machine the combination with a paper-support, of a plurality of type mechanisms mounted to travel along the line of writing, a keyboard in operative connection with one of said mechanisms, and means for dismissing the active mechanism and bringing an idle mechanism into operative connection with the keyboard.

33. In a type-writing machine the combination with a paper-support, of a plurality of type mechanisms mounted to travel along the line of writing, a keyboard in operative connection with one of said mechanisms, and means for automatically dismissing the active mechanism and bringing an idle mechanism into operative connection with the keyboard.

34. In a type-writing machine the combination of a paper-support, a plurality of type mechanisms, a keyboard in operative connection with one of said mechanisms, and means for dismissing the active mechanism and bringing an idle mechanism into operative connection with the keyboard automatically and at will.

35. In a type-writing machine the combination with a paper-support, of a plurality of type mechanisms, a keyboard in operative connection with one of said mechanisms, means for dismissing the active mechanism and bringing an idle mechanism into operative connection with the keyboard, and means for advancing the paper a line-space upon the dismissal of a type mechanism.

36. In a type-writing machine the combination with a paper-support, of traveling type mechanisms, means for operating one of said mechanisms and moving it along the line of writing, means for rendering the type mechanism inoperative automatically during the writing and bringing another type mechanism into operation.

37. In a type-writing machine the combination with a paper-support, of traveling type mechanisms, means for operating one of said mechanisms and moving it along the line of writing, means for automatically rendering the active mechanism inoperative during the writing and bringing another type mechanism into operation, and means for advancing the paper a line-space at the instant of alternation.

38. In a type-writing machine the combination with a paper-support, of traveling type mechanisms, means for operating said mechanisms successively, means for automatically dismissing the active mechanism at the end of a line of writing, and bringing another mechanism into active operation at the beginning of the next succeeding line of writing, and means for returning the dismissed mechanism to initial position.

39. In a type-writing machine the combination with a paper-support, of traveling type mechanisms, means for operating one of said mechanisms and moving it along the line of writing, means for dismissing the active mechanism automatically at the end of a line of writing and elsewhere in the line at will by the operator, and thereby bringing another mechanism under control of the operating mechanism at the beginning of the next succeeding line of writing, and means for automatically returning the dismissed mechanism to initial position.

40. In a type-writing machine the combination with a paper-support, of traveling type mechanisms, means for operating one of said mechanisms along the line of writing, means for dismissing the active mechanism automatically during the writing and at will by the operator, means for rotating the paper-support to effect the line-spacing, means for bringing another type mechanism under control of the operating means at the initial point, and means for returning the dismissed mechanism to initial position.

41. In a type-writing machine the combination with a paper-support, of independent type mechanisms mounted to travel in an endless path, means for operating one of said mechanisms along the line of writing, means for dismissing this mechanism automatically at the end of a line of writing and automatically bringing another mechanism under control of the operating means at the beginning of the next succeeding line of writing, and means for returning the dismissed type mechanism to initial position.

42. In a type-writing machine the combination with a paper-support of independent type mechanisms mounted to travel in an endless path, means for operating one of said mechanisms along the line of writing, means for dismissing this mechanism automatically at the end of a line and elsewhere at will by the operator, and thereby causing a line-spacing of the paper and the bringing of another type mechanism under control of the operating means at a predetermined initial point, and means for returning the dismissed type mechanism to initial position.

43. In a type-writing machine the combination of a traveling type mechanism, means for operating said mechanism and advancing it step by step along the line of writing, and means for disconnecting said mechanism from its operating means and for making its movement continuous.

44. In a type-writing machine the combination of a traveling type mechanism, means for advancing said mechanism a step along the line of writing upon the impression of each type character, and means for simultaneously rendering the type mechanism inactive and making the forward movement continuous.

45. In a type-writing machine the combination with a paper-support, of a reciprocating type-wheel containing types in a plurality of vertical and horizontal rows, means for bringing the desired vertical row of type into operative position, means controlling the vertical position of the paper-support to secure an impression of a particular type in said row, and means for advancing the type-wheel one step after each impression.

46. In a type-writing machine the combination with a paper-supporting platen, of a type-wheel mounted to travel along the line of writing and containing types in a plurality of vertical and horizontal rows, key-controlled means for rotating said type-wheel to bring the desired vertical row of types into operative position, key-controlled means for vertically moving said platen to receive an impression of a particular type in said row, and means for automatically reciprocating said type-wheel to make an impression.

47. In a type-writing machine the combination with a paper-supporting platen, of a type-support containing types in a plurality of vertical and horizontal rows, key-controlled means for rotating said type-support to bring the desired vertical row of types into operative position, means for moving said platen to receive the impression of a particular type in said row, means for automatically reciprocating said type-support to make an impression, and means for automatically advancing said type-support one step following each impression.

48. In a type-writing machine the combination of a plurality of type mechanisms, spacing devices for each type mechanism, operating mechanism, and means for bringing said operating mechanism successively into operative relation with said spacing devices.

49. In a type-writing machine the combination of a plurality of type mechanisms, spacing devices for each type mechanism, mechanism for operating said spacing devices at each operation of the type mechanism and at will, and means for bringing the operating mechanism successively into operative relation with said spacing devices.

50. In a type-writing machine the combination of a plurality of type mechanisms, means tending to advance said type mechanisms, escapement devices for each type mechanism causing a step-by-step movement of said mechanism, operating mechanism, and means for bringing the operating mechanism successively into operative relation with the escapement devices of different type mechanisms.

51. In a type-writing machine the combination of two type mechanisms, means tending to advance said type mechanisms, escapement devices for each mechanism for causing a step-by-step movement of said mechanism, operating mechanism for said escapement devices, means for releasing a type mechanism from control of its escapement devices, and means whereby the release of a type mechanism shifts the said operating mechanism into operative relation with the escapement devices of another type mechanism.

52. In a type-writing machine the combination of two type mechanisms, means tending to advance said type mechanisms, escapement devices for each mechanism for causing a step-by-step movement of said mechanism, operating mechanism for said escapement devices, means for releasing a type mechanism from control of its escapement devices, and means whereby the release of a type mechanism shifts said operating mechanism and releasing means into operative relation with the escapement devices of another type mechanism.

53. In a type-writing machine the combination of a type mechanism, spacing mechanism for causing a step-by-step movement of the type mechanism along the line of writing, means for disconnecting the type mechanism and spacing mechanism, and means for returning the type mechanism to initial position and reconnecting the spacing mechanism therewith.

54. In a type-writing machine the combination of a type mechanism, spacing mechanism for causing a step-by-step movement of the type mechanism along the line of writing, means for returning the type mechanism to initial position, and means operated as the type mechanism comes into initial position for reconnecting the spacing mechanism therewith.

55. In a type-writing machine the combination of a carriage, spacing mechanism therefor, means for automatically disconnecting the carriage and spacing mechanism, means for returning the carriage to initial position, and means operated by the carriage as it comes into initial position for again connecting the spacing mechanism therewith.

56. In a type-writing machine the combination of a carriage, spacing mechanism therefor, means for automatically disconnecting the carriage and spacing mechanism, means for returning the carriage to initial position, an adjustable stop for determining the initial position of the carriage, and means operated by the carriage as it engages the stop for again connecting the spacing mechanism therewith.

57. In a type-writing machine the combination of two type-carriages, spacing mechanism for each carriage, means for retaining one carriage at initial position, operating means acting on the spacing mechanism of the other carriage, means for disconnecting the active carriage and its spacing mechanism, shifting the operating means to act upon the spacing mechanism of the inactive carriage, and releasing the inactive carriage.

58. In a type-writing machine the combination with a paper-support, of a type mechanism, a stationary keyboard for controlling the operation of the type mechanism, means for advancing said type mechanism along the line of writing after each impression, and means for operating the paper-support for line-spacing.

59. In a type-writing machine the combination of a type mechanism, a spacing mechanism for advancing said type mechanism along the line of writing, a keyboard for controlling the operation of the type mechanism and spacing mechanism, a spacing-key, and means for automatically returning the type mechanism to initial position upon the operation of the spacing-key subsequent to a predetermined point in the line of writing.

60. In a type-writing machine the combination of a paper-support, a type mechanism, a spacing mechanism for advancing one of said parts along the line of writing, a keyboard for controlling the impressions and spacing, a spacing-key, and means for automatically returning to initial position the part moved by the spacing mechanism upon the operation of the spacing-key subsequent to a predetermined point in the line of writing.

61. In a type-writing machine the combination of a type mechanism, a spacing mechanism therefor, a keyboard for controlling the impressions and spacing, a spacing-key, means for returning the type mechanism to initial position, and means for throwing the return means into operation by the spacing-key after the type mechanism reaches a predetermined point in the line of writing.

62. In a type-writing machine the combination of a type mechanism, mounted to travel in an endless path, means for advancing said mechanism step by step along the line of printing or continuously to return it to initial position.

63. In a type-writing machine the combination of type mechanism, means for advancing said mechanism in an endless path by operating the type mechanism and independently thereof at will.

64. In a type-writing machine the combination of a type mechanism, positioning mechanism therefor, mechanism for giving the type mechanism an impression movement, and a mechanism which acts to first connect the type mechanism with the positioning mechanism, then to cause the positioning mechanism to act, and to cause the impression mechanism to act after the positioning mechanism has completed its action.

65. In a type-writing machine the combination of type mechanism, positioning mechanism therefor, mechanism for giving the type mechanism an impression movement, mechanism for spacing the type mechanism, and a mechanism which acts first to connect the type mechanism with the positioning mechanism to then cause the positioning mechanism to act, then to cause the impression mechanism to act after the positioning mechanism has completed its action, and to then cause the spacing mechanism to act.

66. In a type-writing machine the combination of type mechanism, positioning mechanism normally disconnected therefrom, mechanism for connecting the type mechanism with the positioning mechanism, a movable member the movement of which first connects the type mechanism and the positioning mechanism and then causes the positioning mechanism to act, means for operating said member, and keys for causing said operating means to act and for determining the movement of the positioning mechanism.

67. In a type-writing machine the combination of a type mechanism, positioning mechanism therefor, mechanism for giving the type mechanism an impression movement, a member connected to operate the impression mechanism, and provided with means for controlling the operation of the positioning mechanism, means for operating said member, and keys for causing said operating means to act.

68. In a type-writing machine the combination of a type mechanism, positioning mechanism therefor, mechanism for moving the type mechanism to connect it with the positioning mechanism and to make an impression, a member connected to operate the moving mechanism, and provided with means for controlling the operation of the positioning mechanism, and means rendered inoperative as the positioning mechanism completes its operation for arresting the movement of said member.

69. In a type-writing machine the combination of a type mechanism, a shaft, means tending to rotate said shaft, connections between the shaft and type mechanism for operating the same to make an impression, and a key-operated trip-pawl for restraining and releasing said shaft.

70. In a type-writing machine the combination of a type mechanism, a shaft, means tending to rotate said shaft, connections between the shaft and type mechanism for operating the same, a key-operated device for restraining and releasing said shaft, and type-positioning mechanism controlled by said shaft.

71. In a type-writing machine the combination of a type mechanism, a shaft, means tending to rotate said shaft, connections between the shaft and type mechanism for operating the same, a key-operated device for restraining and releasing said shaft, type-positioning mechanism controlled by said shaft and a device rendered inoperative by the operation of the positioning mechanism for arresting rotation of said shaft.

72. In a type-writing machine the combination of a type mechanism, a shaft, means tending to rotate said shaft, connections between the shaft and type mechanism for operating the same, a key-operated device for restraining and releasing said shaft, type-positioning mechanism, key-operated stops for determining the movement of the type-positioning mechanism, and a pawl connected with said stops for arresting the rotation of said shaft.

73. In a type-writing machine the combination of a type mechanism, a shaft, means tending to rotate said shaft, connections between said shaft and type mechanism for operating the same, a key-operated trip-pawl for restraining and releasing said shaft, and a stop-pawl for preventing the complete operating movement of the shaft until the trip-pawl is returned to operative position.

74. In a type-writing machine the combination of a type mechanism, a shaft, means tending to rotate said shaft, connections between the shaft and type mechanism for operating the same, a key-operated trip-pawl for restraining and releasing said shaft, a stop-pawl for preventing the complete operative movement of the shaft until the trip-pawl is returned to operative position, and key-operated means for rendering said stop-pawl inoperative.

75. In a type-writing machine the combination of a type mechanism, a shaft, means tending to rotate said shaft, connections between said shaft and type mechanism for operating the same, a device for restraining and releasing said shaft, a key for operating said device, a latch for preventing the return of said key to normal position, and means on the shaft for releasing said latch.

76. In a type-writing machine the combination of a type mechanism, a shaft, means tending to operate said shaft, connections between said shaft and the type mechanism for operating the same, a key-operated device for restraining and releasing said shaft, type-positioning mechanism, key-operated stops for determining the movement of said positioning mechanism, a device carried by the shaft for releasing said positioning mechanism and returning it to normal position.

77. In a type-writing machine the combination of a traveling type mechanism, a rack extending along the path of travel of the type mechanism, key-controlled means for reciprocating said rack, and connecting devices between said rack and type mechanism for operating the same.

78. In a type-writing machine the combination of a traveling type-carriage, a type-carrier thereon, a rack extending along the path of travel of the type-carriage, a pinion on the carriage engaging said rack, connecting devices between the pinion and type-carrier for reciprocating the type-carrier, and means for reciprocating the rack.

79. In a type-writing machine the combination of a type-carriage, a type-carrier mounted thereon, a rack, a cam on the type-carriage for controlling the movement of the type-carrier, a pinion connected to rotate the cam in a single direction and engaging the rack, and means for reciprocating said rack.

80. In a type-writing machine the combination of a traveling type-carriage, a rotary type-carrier mounted thereon, a positioning-rack extending along the path of travel of the type-carriage, means for connecting said type-carrier and rack, and means for operating said rack.

81. In a type-writing machine the combination of a traveling type-carriage, a rotary type-carrier mounted thereon, a positioning-rack, a pinion on the carriage connected to rotate the type-carrier, means for engaging and disengaging a rack and pinion, and means for operating the rack.

82. In a type-writing machine the combination of a traveling type-carriage, a rotary type-carrier mounted thereon, a positioning-rack, a pinion on the carriage connected to rotate the carrier, means for moving the type-carrier toward the rack to engage the pinion and rack, and away from said rack to make an impression, means for operating the rack, and means for retaining the type-carrier in position during the impression movement.

83. In a type-writing machine the combination of two traveling type-carriages, a type-carrier on each carriage, a pinion on each carriage, devices between the pinion and type-carrier for reciprocating the carrier, a rack, means for reciprocating said rack, and means for changing the relative position of the rack and pinions to bring either pinion into operative relation to the rack.

85. In a type-writing machine the combination of two traveling type-carriages, a type-carrier on each carriage, a pinion on each carriage, devices between the pinion and type-carrier for reciprocating the carrier, a rack, means for reciprocating the same, and means for shifting said rack into position to engage with either pinion.

85. In a type-writing machine the combination of a traveling type-carriage, a slide thereon, a rotary type-wheel mounted in said slide, a pinion on the slide connected to rotate the type-wheel, a positioning-rack, an operating-rack, connections between the operating-rack and slide to move the slide toward and away from the positioning-rack, and means for operating said rack.

86. In a type-writing machine the combination of a traveling type-carriage, a slide mounted thereon, a rotary type-wheel mounted in the slide, a pinion on the slide connected to rotate the type-wheel, a positioning-rack, a cam on the carriage to move the slide toward the positioning-rack, a spring tending to move the slide away from the positioning-rack, an operating-rack, connections between the operating-rack and cam to rotate the cam in one direction and means for operating the racks.

87. In a type-writing machine the combination of a paper-carrying mechanism, type mechanism, a spacing mechanism for advancing one of said mechanisms, a keyboard for controlling the impressions and spacing, a spacing-key for returning the traveling mechanism to initial position, and means operated by the traveling mechanism for connecting the return mechanism with the spacing-key.

88. In a type-writing machine the combination of a paper-supporting mechanism, type mechanism, a traveling carriage carrying one of said mechanisms, a spacing mechanism for the carriage, a spacing-key, and means controlled by the carriage for causing the return thereof to initial position upon the operation of the spacing-key.

89. In a type-writing machine the combination of a paper-supporting mechanism, type mechanism, a traveling carriage carrying one of said mechanisms, spacing mechanism for the carriage, a spacing-key, means for returning the carriage to initial position, and means controlled by the carriage for connecting the returning means with the spacing-key.

90. In a type-writing machine the combination of a paper-supporting mechanism, type mechanism, a traveling carriage carrying one of said mechanisms, spacing mechanism for the carriage, a spacing-key, means for returning the carriage to initial position, a plate in the path of the carriage, and devices between said plate and the returning means for connecting said means with the space-key.

91. In a type-writing machine the combination of a paper-supporting mechanism, type mechanisms, a traveling carriage carrying one of said mechanisms, spacing mechanism for the carriage, a spacing-key, means for returning the carriage to initial position, means controlled by the carriage for connecting the returning means with the spacing-key, and means for rendering said carriage-controlled means inoperative during the return of the carriage.

92. In a type-writing machine the combination of a paper-supporting mechanism, type mechanism, a carriage for carrying one of said mechanisms, spacing mechanism for the carriage, a keyboard for controlling the impressions and spacing, a spacing-key, means for returning the carriage to initial position, and means for throwing said return means into action by the operation of the spacing-key after the carriage reaches a predetermined point in the line of writing.

93. In a type-writing machine the combination of a paper-supporting mechanism, type mechanism, a carriage for carrying one of said mechanisms, spacing mechanism for the carriage, a keyboard for controlling the impressions and spacing, a space-key, means for automatically returning the carriage to initial position upon the operation of the spacing-key after the carriage has reached a predetermined point in its travel.

94. In a type-writing machine the combination of a type mechanism provided with type characters, devices for making an impression of any one of said characters upon the operation of a corresponding key, means for preventing a repeat of said impression while the key is depressed, and devices for rendering said preventing means inactive at will, and repeating said impression without repeating the operation of the key.

95. In a type-writing machine the combination of a type mechanism provided with type characters, devices for making an impression of any one of said characters upon the operation of a corresponding key, means for preventing a repeat of said impression while the key is depressed, and devices for rendering said preventing means inactive at will, and causing successive repetitions of said impression until said key is released.

96. In a type-writing machine the combination of a type mechanism provided with type characters, devices for making an impression of any one of said characters upon the operation of a corresponding key, means for preventing a repeat of said impression while the key is depressed, and devices for rendering said preventing means inactive at will, and causing successive repetitions of said impression until said key is released, and spacing means operated between successive impressions.

97. In a type-writing machine the combination of type mechanism provided with type characters, devices for making an impression of any one of said characters upon the operation of a corresponding key, means for preventing a repeat of said impression while the key is depressed, and devices for rendering said preventing means inactive at will, and repeating said impression without repeating the operation of the key, and spacing means operated between successive impressions.

98. In a type-writing machine the combination of type mechanism provided with type characters, keys corresponding to said type characters, means for operating said devices to make a single impression upon the operation of the corresponding key, means for preventing a repeat of said impression while the key is depressed, and devices for rendering said preventing means inactive at will, and repeated impressions of the same character without repeating the operation of the key.

99. In a type-writing machine the combination of type mechanism provided with type characters, devices for making an impression of any one of said characters, mechanism for operating said devices, keys corresponding to said type characters, connecting devices whereby the keys cause said operating mechnaism to act, means for arresting said operating mechanism after a single impression, and means for rendering said arresting means inoperative at will.

100. In a type-writing machine the combination of a type mechanism provided with type characters, means for moving the type mechanism to position a character at the impression-point, means for making the impression, and a device for preventing the operation of the impression means tripped by the positioning means.

101. In a type-writing machine the combination of type mechanism, provided with type characters, mechanism for moving the type mechanism to position a character at the impression-point, a series of stops for determining the movement of said positioning mechanism, and means for making the impression, the operation of which is dependent upon the arrest of the positioning mechanism by one of said stops.

102. In a type-writing machine the combination of type mechanism, positioning mechanism for bringing a type character to the impression-point, a series of stops corresponding to the type characters, a plate connected with said stops and having a limited movement, means for making the impression, and a device for restraining the impression means rendered inactive by the movement of said plate.

103. In a type-writing machine the combination of type mechanism, positioning mechanism for bringing a type character to the impression-point, a series of key-operated stops, a plate through which said stops pass, having a limited movement when engaged by the positioning mechanism, and impression-making means controlled through said plate.

104. In a type-writing machine the combination of type mechanism, positioning mechanism for bringing a type character to the impression-point, a series of stops for determining the movement of the positioning mechanism having a limited movement when engaged by said mechanism, and impression-making means controlled through the movement of said stops by the positioning mechanism.

105. In a type-writing machine the combination of type mechanism, power-driven mechanism for operating the same to make an impression, a key, and connections whereby the key causes said operating mechanism to act, and positioning mechanism including a device operated by the key and means for locking the key in operated position until the impression is completed.

106. In a type-writing machine the combination of type mechanism, a coöperating device for making an impression, power-driven mechanism for operating the same to make an impression, a key, and connections whereby the key causes the operating mechanism to act, and positioning mechanism including a device operated by the key and means for preventing the return of the key to normal position until the impression is completed.

107. In a type-writing machine the combination of devices for making an impression of a type character, power-driven operating mechanism therefor, a key, and connections whereby the key causes the operating mechanism to act and positioning mechanism including a device operated by the key, and means for preventing the return of the key to normal position until the impression is completed.

108. In a type-writing machine the combination of a type-carrier, means for giving the type-carrier an impression movement, positioning mechanism disengaged from the type mechanism during its impression movement, a register-plate connected with the type-carrier and provided with guiding-surfaces corresponding to the type characters, a movable stop coöperating with said guiding-surfaces to maintain the position of the type-carrier, and a spring for returning the type-carrier to normal position.

109. In a type-writing machine the combination of a type-carrier, means for giving the type-carrier an impression movement, positioning mechanism disengaged from the type-carrier during its impression movement, a register-plate connected with the type-carrier and provided with guiding-surfaces corresponding with the type characters, a stop for engaging said surfaces and maintaining the position of the type-carrier, means for moving said stop into the path of a guiding-surface after the type-carrier has been positioned and for disengaging said stop after the impression movement of the carrier.

110. In a type-writing machine the combination of a type-carrier, positioning mechanism normally disconnected therefrom, means for giving the type-carrier a movement to connect it with the positioning mechanism and for giving the type-carrier an impression movement, a register-plate connected with the type-carrier and provided with guiding-surfaces corresponding to the type characters, a stop, means for moving the stop into the path of a guiding-surface after the type-carrier has been positioned and for disengaging said stop after the impression movement of the type-carrier.

111. In a type-writing machine the combination of a type mechanism mounted to travel in an endless path, spacing mechanism therefor, and key-controlled means for disconnecting and connecting said spacing mechanism at will.

112. In a type-writing machine the combination of a traveling type mechanism, mechanism tending to advance said type mechanism, spacing mechanism, a brake and key-controlled means for disconnecting and reconnecting the spacing mechanism at will and for applying said brake previous to reconnection.

113. In a type-writing machine the combination of a platen-roll, means tending to rotate the same, a spacing mechanism for causing a line-spacing movement of the roll, and key-controlled means for disconnecting and reconnecting the spacing mechanism at will.

114. In a type-writing machine the combination of a platen-roll, means tending to rotate the same, and key-controlled spacing mechanism for causing a line-spacing movement of the roll, and means for disconnecting said spacing mechanism and causing a continuous rotation of said roll at will.

115. In a type-writing machine the combination of a platen-roll, type mechanism mounted to travel along the line of writing, means for operating the roll to effect line-spacing, or continuously at will.

116. In a type-writing machine the combination of a platen-roll, type mechanism mounted to travel along the line of writing, spacing mechanism for the roll, and means for continuously rotating the roll for a distance greater than a line-space at will.

117. In a type-writing machine the combination of a paper-supporting mechanism, a type mechanism, a carriage carrying one of said mechanisms, mechanism for causing the automatic return of the carriage upon the completion of a line of writing, line-spacing mechanism connected therewith, and key-controlled means for disconnecting said mechanisms.

118. In a type-writing machine the combination of a paper-platen, type mechanism mounted to travel along the line of writing, mechanism for causing the automatic return of the carriage upon the completion of a line of writing, line-spacing mechanism connected therewith, and key-controlled means for disconnecting said mechanisms.

119. In a type-writing machine the combination of a paper-support, a plurality of type mechanisms, operating means, means for automatically dismissing the active mechanism and effecting a line-spacing movement of the paper-support, and means for rendering the automatic line-spacing means inactive at will.

120. In a type-writing machine the combination of a paper-support, a plurality of type mechanisms, operating means, means for automatically dismissing the active mechanism, spacing mechanism for the paper-support connected with the dismiss mechanism, and means for disconnecting said mechanisms at will.

121. In a type-writing machine the combination of a paper-support, a pluraltiy of type mechanisms, operating means, means for automatically dismissing the active mechanism and bringing an inactive mechanism into action, a key, and connections for dismissing the active mechanism and bringing an inactive mechanism into action, spacing mechanism for the paper-support connected with the dismiss mechanism, and means for disconnecting the mechanisms at will.

122. In a type-writing machine the combination of a paper-support, a plurality of type mechanisms, means for automatically dismissing the active mechanism and bringing an inactive mechanism into action, a key, and connections for dismissing the active mechanism and bringing the inactive mechanism into action, spacing mechanism for the paper-support connected with the dismiss mechanism, a key, and connections for disconnecting said mechanisms, and means for maintaining the disconnection during the automatic dismiss, and reconnecting said mechanisms by the operation of the dismiss-key.

123. In a type-writing machine the combination of two alternately-moving carriages, a spring and connections for moving one carriage, a second spring and connections for moving the other carriage, and connections between said springs for tensioning one spring as the other moves its carriage.

124. In a type-writing machine the combination of two alternately-moving type-carriages, a coiled spring and connections for moving one carriage by the unwinding of the spring, a coiled spring and connections for moving the other carriage by the unwinding of the spring, and connections between the springs for winding one as the other unwinds.

In testimony whereof I have affixed my signature in presence of two witnesses.

ARTHUR MAXSON SMITH.

Witnesses:
IRA L. FISH,
KATHARINE A. DUGAN.